(12) United States Patent
Papakostas et al.

(10) Patent No.: US 7,785,704 B2
(45) Date of Patent: Aug. 31, 2010

(54) HIGH TEMPERATURE PRESSURE SENSITIVE DEVICES AND METHODS THEREOF

(75) Inventors: Thomas Papakostas, Larissa (GR); Julian Hou Lima, Brookline, MA (US)

(73) Assignee: Tekscan, Inc., South Boston, MA (US)

( * ) Notice: Subject to any disclaimer, the term of this patent is extended or adjusted under 35 U.S.C. 154(b) by 105 days.

(21) Appl. No.: 10/846,962

(22) Filed: May 14, 2004

(65) Prior Publication Data

US 2006/0147700 A1   Jul. 6, 2006

Related U.S. Application Data

(60) Provisional application No. 60/470,614, filed on May 14, 2003.

(51) Int. Cl.
*B32B 5/16* (2006.01)
*B32B 27/06* (2006.01)
*B32B 27/08* (2006.01)
*B32B 27/20* (2006.01)
*B32B 27/42* (2006.01)
*B32B 9/04* (2006.01)

(52) U.S. Cl. .................. 428/323; 428/332; 428/335; 428/412; 428/413; 428/421; 428/473.5

(58) Field of Classification Search .................. None
See application file for complete search history.

(56) References Cited

U.S. PATENT DOCUMENTS 3,992,212 A   11/1976   Youtsey
4,155,262 A   5/1979   Wong et al.
4,203,648 A   5/1980   Seidler
4,208,648 A   6/1980   Naumann
4,314,227 A   2/1982   Eventoff (Continued)

FOREIGN PATENT DOCUMENTS

EP   0 223 355 A1   5/1987

(Continued)

OTHER PUBLICATIONS

Stevens, H.P. "Technical Support Package on Pressure-Sensitive Resistor Material," *NASA Tech Brief*, vol. 10, No. 1, Item #25 from JPL Invention Report NPO-16537/6043, Jan. 1986.

(Continued)

*Primary Examiner*—Monique R Jackson
(74) *Attorney, Agent, or Firm*—Wolf, Greenfield & Sacks, P.C.

(57) ABSTRACT

A pressure sensitive device that provides a stable response to measure an applied force at temperatures greater than 150° F. (about 66° C.) is disclosed. The pressure sensitive device can have a conductivity of about 0.01 μS to about 1300 μS and a sensitivity of about 0.01 μS/lb to about 300 μS/lb (about 0.02 μS/kg to about 660 μS/kg) at about a temperature range of about −50° F. to over about 400° F. or 420° F. (about −45° C. to over about 205° C. or 216° C.). The pressure sensitive device can have a substrate of polyimide, conductive leads of silver dispersed in a polyhydroxy ether crosslinked with melamine formaldehyde, and a pressure sensitive layer of carbon nanoparticles dispersed in cured polyamic acid forming a polyimide.

50 Claims, 9 Drawing Sheets

U.S. PATENT DOCUMENTS

| | | | |
|---|---|---|---|
| 4,426,884 A | | 1/1984 | Polchaninoff |
| 4,433,223 A | | 2/1984 | Larson et al. |
| 4,488,873 A | | 12/1984 | Bloomfield et al. |
| 4,495,236 A | | 1/1985 | Obara et al. |
| 4,506,250 A | | 3/1985 | Kirby |
| 4,518,833 A | | 5/1985 | Watkins |
| 4,555,953 A | | 12/1985 | Dario et al. |
| 4,634,623 A | | 1/1987 | Watkins |
| 4,684,563 A | | 8/1987 | Hayashi et al. |
| 4,734,034 A | | 3/1988 | Maness et al. |
| 4,856,993 A | | 8/1989 | Maness et al. |
| 5,033,291 A | | 7/1991 | Podoloff et al. |
| 5,079,949 A | * | 1/1992 | Tamori .................. 73/172 |
| 5,086,785 A | | 2/1992 | Gentile et al. |
| 5,090,246 A | * | 2/1992 | Colla et al. ................ 73/718 |
| 5,159,159 A | * | 10/1992 | Asher .................. 178/18.05 |
| 5,181,975 A | * | 1/1993 | Pollack et al. ........... 152/152.1 |
| 5,302,936 A | | 4/1994 | Yaniger |
| 5,323,650 A | * | 6/1994 | Fullen et al. .................. 73/172 |
| 5,541,570 A | | 7/1996 | McDowell |
| 5,581,019 A | | 12/1996 | Minor et al. |
| 5,989,700 A | | 11/1999 | Krivopal |
| 6,450,046 B1 | | 9/2002 | Maeda |
| 6,555,024 B2 | * | 4/2003 | Ueda et al. .................. 252/511 |
| 6,734,262 B2 | * | 5/2004 | Patel .......................... 525/419 |
| 2003/0144388 A1 | * | 7/2003 | Swift et al. .................. 524/79 |
| 2006/0084752 A1 | * | 4/2006 | Ounaies et al. ............. 524/496 |

FOREIGN PATENT DOCUMENTS

| | | |
|---|---|---|
| EP | 0 539 896 A1 | 5/1993 |
| GB | 2 192 186 A | 1/1988 |
| JP | 61207939 | 9/1986 |
| JP | 2-158105 A2 | 6/1990 |
| JP | 7-87123 B | 9/1995 |
| JP | 10-510356 A | 5/1997 |
| JP | 2000-503767 A | 7/1998 |
| WO | WO 96/18197 A1 | 6/1996 |
| WO | WO 97/25379 A1 | 7/1997 |
| WO | WO 02/16801 A2 | 2/2002 |

OTHER PUBLICATIONS

International Search Report for International Application Serial No. PCT/US96/19758, published as International Publication No. WO 97/25379, dated Apr. 29, 1997.

International Search Report for International Application Serial No. PCT/US04/015274, published as International Publication No. WO 04/102144, dated Nov. 11, 2004.

Communication pursuant to Article 96(2) EPC from European Application No. 04761008.4 dated Nov. 3, 2006.

Pending claims in corresponding European Patent Application 04761008.4 as of Nov. 3, 2006.

International Search Report, Sep. 14, 2006 of EP 04761008.4.

Translation of an Official Action from the Japanese Patent Office regarding Japanese Application No. 2006-533111.

* cited by examiner

HIGH TEMPERATURE PRESSURE SENSITIVE DEVICES AND METHODS THEREOF

RELATED APPLICATIONS

This application claims the benefit of U.S. Provisional Patent Application Ser. No. 60/470,614, filed May 14, 2003, entitled "High Temperature Pressure Sensitive Devices and Methods Thereof," by Lima, et al., incorporated herein by reference.

FIELD OF INVENTION

The present invention relates to pressure sensitive materials, devices incorporating such pressure sensitive materials, and methods of fabricating and using such pressure sensitive materials and devices under high temperature conditions.

BACKGROUND OF THE INVENTION

Pressure sensitive materials, such as those derived from solidified pressure sensitive ink, respond in some way to an applied force. For some solidified pressure sensitive inks, their electrical resistivity or conductivity varies as a function of the applied pressure. Pressure sensitive ink has been used for various tactile or pressure sensitive devices such as pressure transducers, sensors, and strain gauges. For example, Maness, et al., in U.S. Pat. Nos. 4,734,034 and 4,856,993, describe a contact sensor for measuring dental occlusion. Also, McDowell, in U.S. Pat. No. 5,541,570, describes a force sensing solidified ink as well and methods of making the ink as well as an improved force sensor. And, Krivopal, in U.S. Pat. No. 5,989,700, describes a pressure sensitive ink and methods of its use.

BRIEF SUMMARY OF THE INVENTION

The present invention is directed to pressure sensitive materials and pressure sensitive inks, as well as to pressure sensitive devices incorporating or utilizing such pressure sensitive materials. More particularly, the present invention is directed to temperature stable pressure sensitive materials and pressure sensitive inks forming such pressure sensitive materials, and to temperature stable pressure sensitive devices having electrical properties that can vary predictably at high temperature. The subject matter of the present invention involves, in some cases, interrelated products, alternative solutions to a particular problem, and/or a plurality of different uses of one or more systems and/or articles.

In accordance with one or more embodiments, the present invention provides a pressure sensitive device comprising a nonconductive supporting substrate comprising a polyimide, a conductive lead supported by the substrate and comprising silver particles dispersed in a polyhydroxy ether crosslinked with melamine formaldehyde, a pressure sensitive material in contact with the conductive lead and supported by the substrate comprising conductive carbon nanoparticles dispersed in an polymeric matrix selected from the group consisting of a silicone rubber, a polyamide-imide polymer, a polyester-imide polymer, a poly(vinylidene fluoride-hexafluoropropylene), a poly(acrylonitrile-butadiene-styrene), a poly(ethylene-2,6-naphthalene dicarbonate), a poly(bisphenol-A carbonate), a polyhydroxy ether resin crosslinked with melamine formaldehyde, a product of a polycondensation reaction of a dianhydride and a diamine, or combinations thereof, and an adhesive material supported by the substrate and comprising a synthetic rubber material and a silane coupling agent.

In accordance with one or more embodiments, the present invention provides a pressure sensitive device. The pressure sensitive device comprises a nonconducting supporting substrate, and a pressure sensitive material supported by the substrate and comprising conductive carbon nanoparticles dispersed in a polymeric matrix selected from the group consisting of a silicone rubber, a polyamide-imide polymer, a polyester-imide polymer, a poly(vinylidene fluoride-hexafluoropropylene), a poly(acrylonitrile-butadiene-styrene), a poly(ethylene-2,6-naphthalene dicarbonate), a poly(bisphenol-A carbonate), a polyhydroxy ether resin crosslinked with melamine formaldehyde, a product of a polycondensation reaction of a dianhydride and a diamine, or combinations thereof.

In accordance with one or more embodiments, the present invention provides a pressure sensitive device having a variation in electrical conductivity in response to an applied force. The pressure sensitive device comprises a substrate comprising a polyimide, and a means for varying the electrical conductivity in response to the applied pressure, where the means has a conductivity of about 0.01 µS/cm to about 1300 µS/cm and a sensitivity of about 0.01 µS/lb to about 300 µS/lb over a temperature range of about 80° F. to about 220° F. In some cases, the means for varying the electrical conductivity can be supported on the substrate. In accordance with one or more embodiments, the pressure sensitive device comprises a substrate comprising a polyimide, a means for varying the electrical conductivity in response to the applied pressure having a conductivity of about 0.01 µS/cm to about 1300 µS/cm and a sensitivity of about 250 to about 300 µS/lb over a temperature range of about 80° F. to about 220° F., said means for varying the electrical conductivity supported on the substrate.

In accordance with one or more embodiments, the present invention provides a pressure sensitive material comprising carbon nanoparticles dispersed in a polymeric matrix such that said pressure sensitive ink has a conductivity of about 0.01 µS/cm to about 1300 µS/cm and a sensitivity of about 0.01 µS/lb to about 300 µS/lb over a temperature range of about 80° F. to about 220° F. In some cases, the temperature range may be of about −50° F. to about 400° F. or 420° F. In accordance with one or more embodiments, the present invention provides a pressure sensitive material comprising a selected quantity of carbon nanoparticles dispersed in a polymeric matrix such that said pressure sensitive ink has a conductivity of about 0.01 µS/cm to about 1300 µS/cm and a sensitivity of about 250 to about 300 µS/lb over a temperature range of about 80° F. to about 220° F.

In accordance with one or more embodiments, the present invention provides a method of fabricating a pressure sensitive device. The method comprises steps of providing a supporting nonconductive substrate, depositing a first electrical conductor and a second electrical conductor on a portion of the substrate, and depositing a pressure sensitive layer on at least a portion of the substrate in electrical communication with the first and second electrical conductors. In some cases, the pressure sensitive layer comprises carbon nanoparticles dispersed in a polymeric material. In one embodiment, the pressure sensitive device may be non-planar.

In accordance with one or more embodiments, the present invention provides a method of fabricating a pressure sensitive device. The method comprises steps of providing a supporting nonconductive substrate, depositing a first electrical lead and a second electrical lead on a portion of the substrate, and depositing a pressure sensitive material on at least a portion of the substrate in electrical communication with the first and second electrical leads. In some cases, the pressure sensitive material has properties such that an electrical conductance measured across the electrical leads varies in response to an applied force such that it has a conductivity of about 0.01 µS/cm to about 1300 µS/cm and a sensitivity of about 0.01 µS/lb to about 300 µS/lb over a temperature range of about 80° F. to about 220° F. In one embodiment, the pressure sensitive device may be non-planar. In accordance with one or more embodiments, the pressure sensitive material fabricated by the method has properties such that an electrical conductance measured across the electrical leads varies in response to an applied force such that it has a conductivity of about 0.01 µS/cm to about 1300 µS/cm and a sensitivity of about 250 to about 300 µS/lb over a temperature range of about 80° F. to about 220° F.

In accordance with one or more embodiments, the present invention provides a method of determining force applied to a pressure sensitive device. The method comprises steps of applying a force on a pressure sensitive material comprising carbon nanoparticles dispersed in a polymeric matrix, and measuring a resultant conductivity across the pressure sensitive material. The pressure sensitive material, in one embodiment, has a conductivity of about 0.01 µS/cm to about 1300 µS/cm and a sensitivity of about 0.01 µS/lb to about 300 µS/lb over a temperature range of about 80° F. to about 220° F. In accordance with one or more embodiments, the pressure sensitive material has a conductivity of about 0.01 µS/cm to about 1300 µS/cm and a sensitivity of about 250 to about 300 µS/lb over a temperature range of about 80° F. to about 220° F.

In accordance with one or more embodiments, the present invention provides a pressure sensitive device comprising a nonconducting supporting substrate, and a pressure sensitive material supported by the substrate and comprising conductive carbon particles dispersed in an polymeric matrix selected from the group consisting of polyvinylidene fluoride, a reaction product of a phenoxy and at least about 10 wt % melamine, or combinations thereof.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE SEVERAL VIEWS OF THE DRAWINGS

The accompanying drawings are not intended to be drawn to scale. In the drawings, typically each identical or nearly identical component that is illustrated in various figures is represented by a like numeral. For purposes of clarity, not every component may be labeled in every drawing. In the drawings.

DETAILED DESCRIPTION OF THE INVENTION

As used herein, the phrase "pressure sensitive material" refers to a solid material, typically a polymeric material, having at least one material property, other than shape or, density, typically electrical resistivity, or conductivity, that predictably varies as a function of the force applied to the material. The phrase "pressure sensitive ink," as used herein, refers to a fluent material that, upon solidification via, e.g., polymer curing and/or polymerization and/or solvent evaporation, forms a pressure sensitive material.

In accordance with one or more embodiments, the present invention provides a pressure sensitive ink able to form a pressure sensitive material having a selected pressure sensitivity designed for use as the pressure sensitive component of a pressure sensitive device. The solidified pressure sensitive ink can comprise carbon nanoparticles dispersed in a polymerized polyimide matrix. The solidified pressure sensitive ink can have a conductivity of between about 0.01 microSiemens/cm (µS/cm) to about 1300 µS/cm, typically about 200 µS/cm to about 1 milliSiemen/cm (mS/cm), with a sensitivity of about 0.01 µS/lb to about 300 µS/lb (about 0.02 µS/kg to about 660 µS/kg), and in some cases between about 250 µS/lb and about 300 µS/lb (about 550 µS/kg and about 660 µS/kg), over a temperature range of from about 80° F. to about 220° F. (about 27° C. to about 105° C.), and in certain embodiments, over a temperature range of from about −50° F. to about 350° F., about 400° F., or about 420° F. (about −45° C. to about 176° C., about 205° C., about 216° C.) or greater. The polyimide matrix can comprise a polycondensation reaction product of a dianhydride and a diamine in one set of embodiments.

Figure 1:
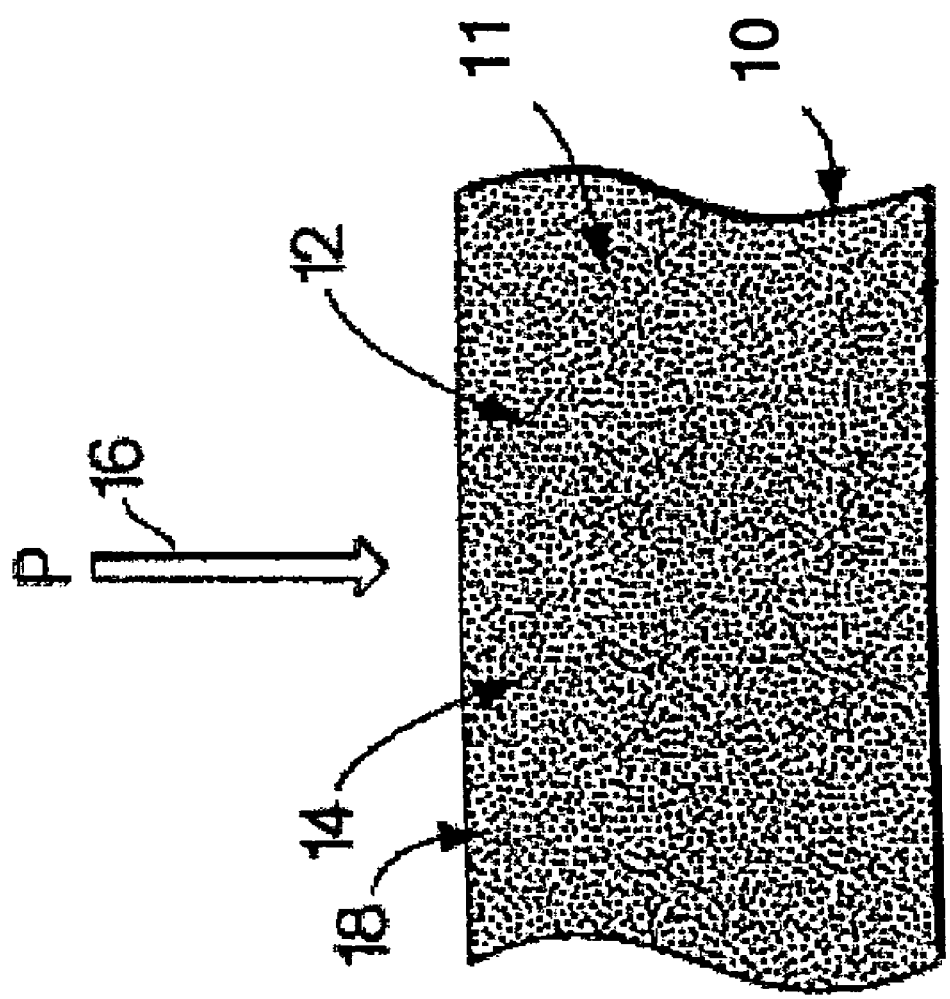
FIG. 1 is a cross-sectional diagram of a solidified pressure sensitive ink, according to one or more embodiments of the invention.

One embodiment of an inventive pressure sensitive ink or pressure sensitive material or layer is shown in FIG. 1. Pressure sensitive material 10 can comprise an elastomeric or polymeric binder or matrix 11 incorporating, typically substantially uniformly therethrough, a plurality of particles 12 which may be conductive or semiconductive, such that the pressure sensitive material 10, when cured and/or dried, provides a response that can be represented as a change in electrical resistivity or conductivity upon the application and/or relaxation of a pressure or force P, designated by reference number 16, applied to material 10. That is, in one or more embodiments, pressure sensitive material 10 and/or a composite structure having a plurality of layers 10 at least partially overlaying each other can provide an increase in electrical conductive pathways upon the application of a force or pressure. This may result in an increase in electrical conductivity such that the conductivity (or the change of conductivity) can be measured, which may be an indication of the magnitude of the force or pressure applied. The polymeric/elastomeric matrix 11 may be comprised of one or more of the high temperature stable polymers, e.g., as described below. In some cases, pressure sensitive material 10 can further comprise a dielectric material 14 mixed with and/or forming at least a part of the elastomeric matrix 11. In certain instances, the elastomeric matrix 11 can further incorporate fillers 18, e.g. reinforcing or non-reinforcing fillers, that can be tailored to provide variations in the mechanical and/or chemical properties of pressure sensitive layer 10, as would be understood by those skilled in the art.

In accordance with one or more embodiments, the present invention provides a pressure sensitive device. The pressure sensitive device can comprise a supporting nonconductive substrate; conductive lead(s) supported by the substrate, comprising electrically conductive metal dispersed in a polymeric matrix; and a pressure sensitive material supported by the substrate and electrically connected to the conductive lead(s). The pressure sensitive material can comprise solidified pressure sensitive ink with carbon particles dispersed in a polymeric matrix such as polyimide, i.e. cured polyamic acid. In some embodiments, the pressure sensitive material can comprise conductive carbon nanoparticles dispersed in an elastomeric matrix. The material, in some cases, can comprise any one or more of: a product of a polycondensation reaction of a dianhydride and a diamine; a polyamide-imide polymer; polyester-imide polymer; a poly(vinylidene fluoride-hexafluoropropylene); a poly(acrylonitrile-butadiene-styrene); a poly(ethylene 2,6-naphthalene dicarbonate); a poly(bisphenol-A carbonate); as well as combinations of these and/or other materials.

The pressure sensitive device may be constructed from materials and components that provide improved high temperature capability and/or stability, for example, in certain embodiments, at operating temperatures from about 50° F. (about −45° C.) to greater than about 150° F. (about 65° C.), and for some embodiments as much as about 350° F., about 400° F., or about 420° F. (about 176° C., about 205° C., or about 216° C.), and sometimes more. Typical devices have improved conductivities and sensitivities ranging from about 0.01 µS/cm to about 1300 µS/cm. In some embodiments, the pressure sensitive devices are constructed of materials and components that provide improved high temperature capabilities with sensitivities of about 0.01 µS/lb to about 300 µS/lb (about 0.02 µS/kg to about 660 µS/kg), and in some cases between about 250 µS/lb and about 300 µS/lb (about 550 µS/kg and about 660 µS/kg) over a temperature range from about 80° F. to about 220° F. (about 27° C. to about 105° C.), or even from about 50° F. to about 350° F., about 400° F., or about 420° F. (about −45° C. to about 176° C., about 205° C., or about 216° C.) or greater in some cases. The pressure sensitive material may provide a variation in electrical conductivity/resistivity corresponding to an applied force or pressure. Certain embodiments also provide a pressure sensitive device that are constructed of materials and components that provide improved hysterisis and drift performance at certain high temperature conditions.

Figure 2:
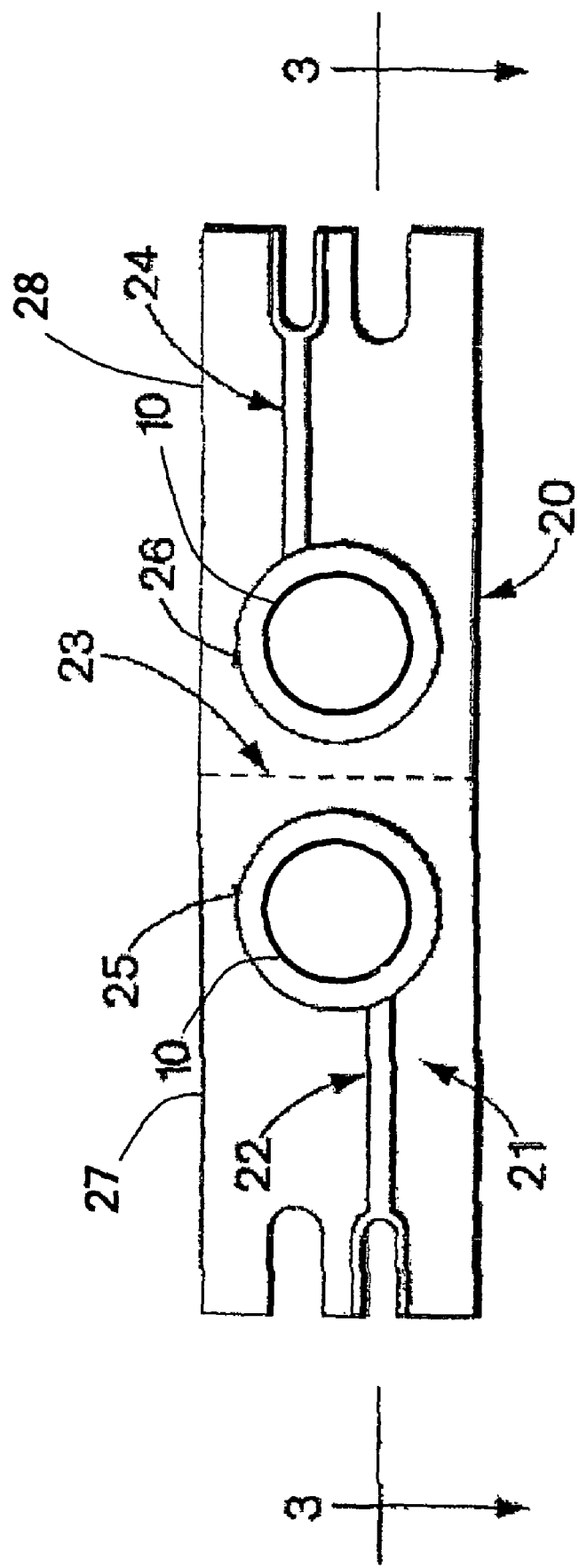
FIG. 2 is plan view of a solidified pressure sensitive device, according to one or more embodiments of the invention.

Typical pressure sensitive devices in which the pressure sensitive inks and/or pressure sensitive materials of this invention can be used include pressure transducers, such as load cells, button cells, strain gauges, pressure gauges, and other pressure sensors. For example, FIG. 2 shows an example pressure sensitive device 20 according to one embodiment of the present invention. The pressure sensitive device 20 incorporates pressure sensitive layers 10 in a button cell assembly in this figure. The pressure sensitive device 20 has a layer or substrate 21 providing structural support for assembled pressure sensitive device 20, shown in a cross-sectional view in FIG. 3. As will be further described below, substrate 21 may be insulating and/or non-conductive and, in certain embodiments, may comprise a polyimide film. Substrate 21 is defined into a first segment 27 and a second segment 28 by a centerfold line 23 in FIG. 2. Further, the pressure sensitive device 20 has electrically conductive leads 22 and 24 deposited on a surface of substrate 21; the first conductive lead 22 is deposited on first segment 27 and the second conductive lead 24 is deposited on second segment 28. Substrate 21 and conductive leads 22 and 24 may be mechanically and/or chemically stable at over a temperature range, including temperatures of at least about −50° F. (about −45° C.) to temperatures of at least about 150° F. (about 65° C.), as well as temperatures up to and including at least about 350° F., about 400° F., or about 420° F. (about 176° C., about 205° C., or about 216° C.).

Conductive leads 22 and 24 can further comprise conductive portions 25 and 26, respectively, which can be thin and highly conductive, and can be disc- or circularly- or square-shaped in some cases. The conductive leads 22 and 24 as well as round conductive portions 25 and 26, in certain embodiments, may have a resistivity in the range of from about $10^{-6}$ to $10^{-4}$ ohm-centimeters. Conductive leads 22 and 24 can be connected to conventional electrical testing or measurement apparatus for measuring resistivity or conductivity, such as those described in U.S. Pat. No. 4,734,034.

The pressure sensitive device 20 may further comprise, deposited thereon, a solidified pressure sensitive ink or other pressure sensitive material comprising layers 10, for example, on either side of center line 23 in the illustrated embodiment of FIG. 2. A solidified pressure sensitive ink or other pressure sensitive material may be deposited on conductive portions 25 and 26, and symmetrically spaced so as to overlie each other as when pressure sensitive device 20 is folded along line 23, thereby creating a non-planar device. As shown in the embodiment of FIG. 3, the assembly of pressure sensitive device 20 includes a folding of the device along the line 23 to form a sandwich layer structure.

Figure 3:
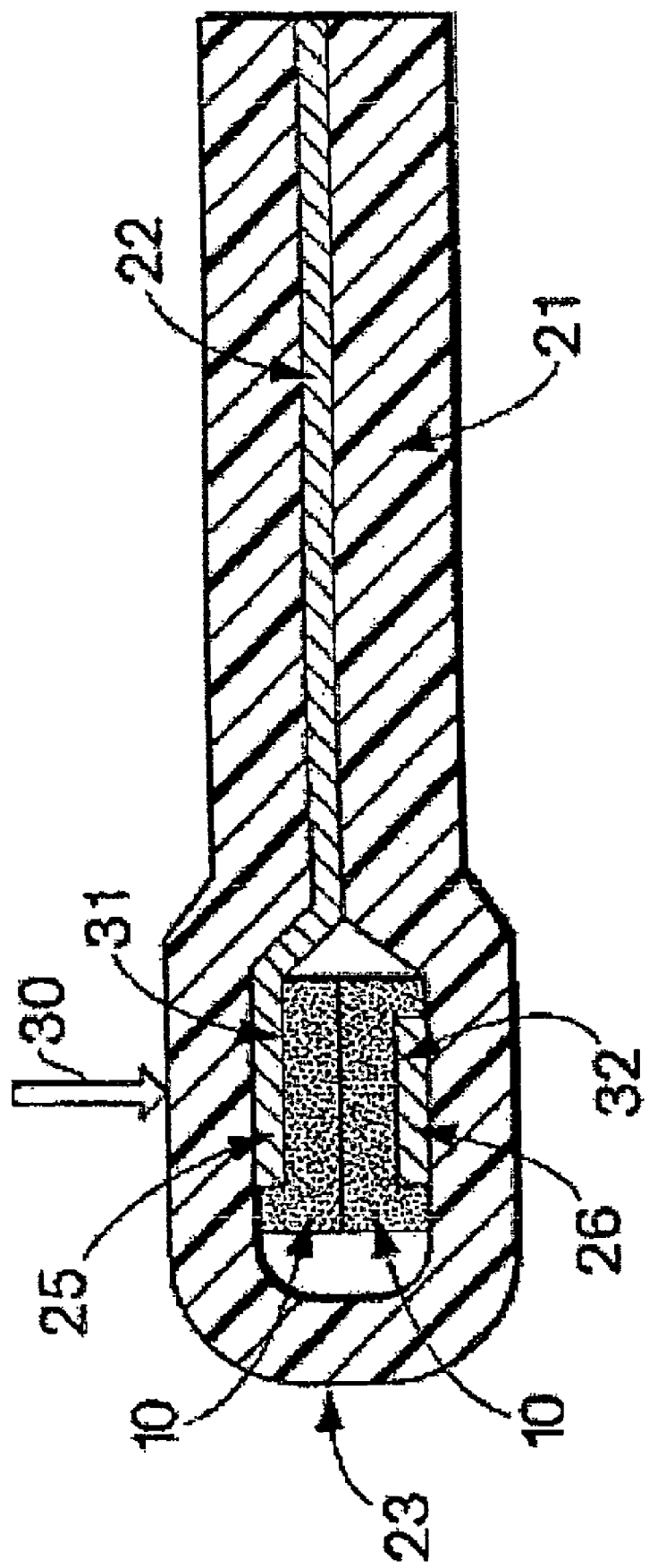
FIG. 3 is a cross-sectional view through section 3-3 of an assembled pressure sensitive device shown in FIG. 2.

Pressure or force on the pressure sensitive device 20, as designated by arrow 30 in FIG. 3, induces a variation in the contact electrical conductance between the pressure sensitive layers and/or within one or both of layers 10, which can be measured across conductive leads 22 and 24 (not visible). The magnitude of the contact conductance between the pressure sensitive layers 10 may vary with the magnitude of the applied force 30. This change in resistivity/conductivity with increasing or decreasing pressure can be measured by standard electronics, as known in the art. Pressure sensitive layers 10 can be deposited with a plurality of layers in a variety of thicknesses, for example, ranging from about 0.2 mil to about 2 mil (about 5 micrometers to about 50 micrometers).

In one or more embodiments according to the present invention, the supporting substrate can comprise a polyimide resin. Examples of commercially available polyimide resins which can be used as the supporting substrate include, but are not limited to, KAPTON® polyimide film available from E. I. DuPont de Nemours and Company, Wilmington, Del., or APICAL™ polyimide film, available from Kaneka High-Tech Materials, Inc., Pasadena, Tex. Other suitable commercially available materials for the substrate include liquid crystalline polymer film(s) such as those available from Foster-Miller, Inc., Waltham, Mass., or polyethylene naphthalene (PEN) such as KALADEX® PEN film available from E. I. DuPont de Nemours and Company, Wilmington, Del. The substrate may provide support for the components of the pressure sensitive device when assembled as described below, and in some cases, be sufficiently flexible when a force is applied thereon such that it minimally, if at all, affects the applied force. That is, it provides negligible resistance in response to the applied force. The device can be constructed from materials that enable it to be mechanically and/or chemically stable in service, including service over a temperature range from about 80° F. to about 220° F. (about 27° C. to about 105° C.), and in certain embodiments, over a temperature range of from about −50° F. to about 350° F., about 400° F., or about 420° F. (about −45° C. to about 176° C., about 205° C., about 216° C.) or greater.

In one or more embodiments according to the present invention, the conductive lead or layer of an inventive pressure sensitive device can comprise a solidified electrically conductive ink. The conductive layer or solidified conductive ink can be configured in the device such that it provides electrical communication to external instrumentation to and from the pressure sensitive component of the device, which may be formed from a pressure sensitive material or solidified pressure sensitive ink of the invention. Like the other components, the material of the conductive layer may preferably be mechanically and/or chemically stable in service, including in certain embodiments service at temperatures of between about −50° F. (about −45° C.) to greater than about 150° F. (about 65° C.), and in certain embodiments up to about 220° F. (about 105° C.) and, in yet other embodiments, up to about 350° F., about 400° F., or about 420° F. (about 176° C., about 205° C., or about 216° C.) or more. In some embodiments, the conductive lead or layer can comprise silver particles dispersed in a crosslinked polymeric matrix. In certain embodiments, the crosslinked polymeric matrix can comprise a reaction product of a polyhydroxy compound and a crosslinker compound. The polyhydroxy compound can be selected from one or more of: a phenoxy compound; an epoxy compound; an acrylic polyol compound; hydroxyl-functional polyester compound; a hydroxyl-functional polyether compound; a polyvinyl alcohol compound; and/or a polyvinyl butyral compound, as well as combinations of these and/or other polyhydroxy compounds. Examples of suitable phenoxy compounds include, but are not limited to, 4,4'-(methylethylidene)bispolymer with chloromethyl oxirane such as those commercially available as PAPHEN®, PKHC®, PKHH®, PKHJ®, PKHP®, and PKFE® phenoxy resins available from Phenoxy Specialties, Inc., Rock Hill, S.C. Other non-limiting examples of suitable conductive materials include those described by Krivopal in U.S. Pat. No. 5,989,700, which is incorporated herein by reference in its entirety.

The crosslinker can comprise any one or more of melamine formaldehyde, phenol formaldehyde, urea formaldehyde, anhydrides, amines (e.g., primary or secondary amines), dianhydrides, polyanhydrides, diisocyanates, polyisocyanates, polyurethane prepolymers, and silanes, as well as combinations of these and/or other suitable crosslinker compositions. For instance, suitable non-limiting examples of commercially available melamine formaldehyde material include ISOMIN™, MELAICAR™, MELBRITE™, MELMEX™, MELOPAS™, RESART™, RESIMINE™, and ULTRAPAS™. In some embodiments, the crosslinker is a phenol formaldehyde or a phenolic resin, such as BAKELITE™ resin available from Bakelite AG, Iserlohn, Germany, SANTOLINK™ resin available from Solutia, Inc., St. Louis, Mo., or resins from the Georgia Pacific GPRI 7000 resin family, available from Georgia Pacific, Atlanta, Ga.

For example, in some embodiments, the conductive ink can comprise about 10 wt % to about 30 wt % solvent (described below), about 5 wt % to about 20 wt % polymeric matrix, and at least about 55 wt % silver particles. The conductive ink can optionally comprise up to about 2 wt % of an additive such as adhesion promoters, surface tension modifiers, antifoam agents, viscosity modifiers, coloring pigments, or the like, as well as combinations of these and/or other suitable materials. Those of ordinary skill in the art can readily select such additives to achieve any desired properties. Specific non-limiting examples of commercially available conductive preformed silver ink useable as the conductive layer of certain embodiments of the invention include those that are commercially available, e.g., DUPONT 5028, DUPONT 5025, or DUPONT 6492 conductive ink, each available from E. I. DuPont de Nemours and Company, Wilmington, Del., and ELECTRODRAG® 478SS and 479SS silver based polymer thick film inks, available from Acheson Colloids Company, Port Huron, Mich. of suitable materials that can be used in the conductive ink utilized in the devices of the present invention include organometallic inks that can form films of high metal content and, hence, can be very conductive. Non-limiting examples of organometallic inks include Parmod TKA-100 and Parmod VLT, each available from Parelec, Inc., Rocky Hill, N.J.

In some cases, the conductive ink can comprise additives such as wetting agents, dispersing agents, de-foaming agents, leveling agents, and/or adhesion promoters, and any additives so added may be, for example, between about 0.05% and 0.5% of the total binder weight.

In one or more embodiments according to the present invention, the pressure sensitive material comprises a polymeric, optionally elastomeric, matrix, which can comprise a product of a polycondensation reaction of a dianhydride with a diamine. In some embodiments, the carbon nanoparticles can be dispersed in the elastomeric matrix at a loading of about 2 wt % to about 9 wt %. The elastomeric matrix may further comprise a filler, such as a reinforcing filler including, but not limited to, fumed silica dioxide.

In some embodiments, the pressure sensitive material comprises a polymeric/elastomeric matrix comprising a polyimide resin. In some cases, the polyimide resin may be cured polyamic acid resin. Examples of commercially available polyamic acid resins that can be used in accordance with the present invention include, but are not limited to, the SKYBOND® resin family, such as the SKYBOND® 700 series MDA free resin, the SKYBOND® 703 series BTDA/MDA based resin, and the SKYBOND® 705 series film formable resin, each available from Industrial Summit Technology, Parlin, N.J. Other suitable examples of commercially available polyamic acid resins include MATRIMID® 5218 and 5292 resins, each available from Vatico AG, Basel, Switzerland; the DURIMIDE™ 100 series, 7000 series, 7500 series, and 7800 series resins, available from Arch Chemicals, Inc., Norwalk, Conn.; the VESPEL® resin family available from DuPont Engineering Polymers, Newark, Del.; as well as HL-P200 resin, HL-P500 resin, and HL-P800 resin, each available from Hitachi Chemicals Co., Ltd., Tokyo, Japan. Non-limiting examples of commercially available polyimide resins include Probimide 348, Probimide 412, and XU-287 from Ciba-Geigy, Basel, Switzerland; PI-2540, PI-2545, PI-2560, PI-5878, Pylarin PI-2611, and Piralux from DuPont; and PI QL 100, PI XL 110 from Hitachi.

For embodiments utilizing a pressure sensitive material comprising a reaction product of a dianhydride with a diamine, the dianhydride can potentially comprise any one or more of pyromellitic dianhydride or 1,2,4,5-tetracarboxylic benzene dianhydride (PDMA), 3,4,3',4'-benzophenone tetracarboxylic dianhydride (BTDA), 3,4,3',4'-biphenyl tetracarboxylic dianhydride (BPDA), terphenyl tetracarboxylic dianhydride (TPDA), 3,3',4,4'-oxydiphthalic dianhydride (OPDA), 2,2'-bis[4-(3,4-dicarboxyphenoxy)phenyl]propane dianhydride (BPADA), 3,3',4,4'-diphenylsulfone tetracarboxylic dianhydride (DSDA), bis(3,4-dicarboxyphenyl)dimethylsilane dianhydride (SiDA), as well as combinations of these and/or other dianhydrides. The diamine can potentially comprise any one or more of 4,4'-oxydiamine, 4,4'-diamino diphenyl or 4-amino phenyl ether, 4,4'-methylenedianiline (ODA), 4,4'-diamino diphenyl methane (MDA), meta-phenyl diamine (MPD), 1,3-phenylene diamine (1,3-PDA), 1,4-phenylene diamine (1,4-PDA), isophorone diamine (IPDA), (1,1'-biphenyl)-4,4'-diamine (DAF), 1,3-bis(3-aminophenoxy)benzene (APB-133), 1,3-bis(4-aminophenoxy)benzene (APB-134), durene diamine or 2,3,5,6-tetramethylphenylenediamine (DAD), as well as combinations of these and/or other diamines. Some suitable combinations of dianhydride with diamine include, but are not limited to, PDMA with ODA, BPDA with ODA, BPDA with MDA, BPTA with MDA, ODPA with ODA, BTDA with ODA, BTDA with MDA, PMDA with PDA, BTDA with PDA, and PMDA with MPD.

The fluent pressure sensitive ink suitable for use in the pressure sensitive device according to one embodiment of the present invention can comprise up to about 85 wt % of a suitable solvent, from about 15 wt % to about 95 wt % polymeric material, and about 1 wt % to about 30 wt % carbon particles (dry weight), or about 1 wt % to about 10 wt % carbon particles (dry weight), or about 1.5 wt % to about 3.5 wt % carbon particles (dry weight). The relative amount of the starting materials comprising the polymeric matrix can be varied to achieve desired physical properties. For example, the polyimide resin can comprise a product of a reaction of a diamine and a dianhydride. In some cases, substantially equimolar amounts of diamine and dianhydride may be used; in other cases, the relative amounts of each can be adjusted as necessary to target certain desired physical properties. Some polyimide precursors may be commercially available in the form of polyamic acids. To slightly modify the pressure sensitive ink for improved processing and other properties, in some cases, the pressure sensitive ink can further have up to about 2 wt % of one or more additives such as adhesion promoters, surface tension modifies, antifoaming agents, viscosity modifies, pigments, or the like, as well as combinations of these and/or other suitable additives. Those of ordinary skill in the art can readily select the amount and type of additive using no more than routine experimentation to achieve a desired set of properties.

In accordance with yet other embodiments, the pressure sensitive device may further comprise a dielectric material that is able to electrically isolate the conductive lead or layer from other conductive leads or layers. For example, a dielectric material can be deposited adjacent, on, or both adjacent and on one or more conductive leads to prevent electrical communication with another conductive lead or layer. The dielectric material can comprise, for example, a polyhydroxy ether resin and/or a polyhydroxy ether resin crosslinked with melamine formaldehyde. Examples of polyhydroxy ether resins and crosslinking compounds suitable for use as the dielectric material include, but are not limited to, those discussed above as useful forming the pressure sensitive material. Other polymers and polymer systems that might be used for high temperature dielectrics include polyimide resulting from the reaction of a dianhydride and a diamine.

Specific non-limiting examples of commercially available products suitable for use as the dielectric material include, but are not limited to, the SKYBOND® polyimide resin family, such as the SKYBOND® 700 series MDA free polyimide resin, the SKYBOND® 703 series BTDA/MDA based polyimide resin, and the SKYBOND® 705 series film formable polyimide resin, each available from Industrial Summit Technology, Parlin, N.J.; DUPONT 5018G and 5036 resins, available from E. I. DuPont de Nemours and Company, Wilmington, Del.; ELECTRODRAG® 451 SS and 452SS resins available from Acheson Colloids Company, Port Huron, Mich. In some cases, phenoxy resins crosslinked with one or more of melamine formaldehydes, phenolics, urea formaldehydes, anhydrides, diisocianates, and silanes may be potentially useful in high temperature dielectric materials. Other potentially useful polymers include acrylic polyols, polyesters with hydroxyl functionality, polyvinyl alcohols, polyvinyl butyral, crosslinked with any of the following material: melamine formaldehydes, pheonolics, urea formaldehydes, anhydrides, diisocianates and silanes. UV curable dielectric pastes based on acrylic and acrylate compounds may also be useful. Some examples of commercial UV curable pastes include DUPONT 5018G, Acheson Electrodag 451SS and Acheson Electrodag 452SS.

In accordance with one or more embodiments, the present invention provides a pressure sensitive device comprising a nonconducting supporting substrate, and a pressure sensitive material supported by the substrate comprising conductive carbon particles dispersed in an polymeric matrix, which may include polyvinylidene fluoride and/or a reaction product of a phenoxy and at least about 10 wt % melamine. The polymeric matrix can comprise about 9 wt % carbon particles in some cases. In the certain instances, the polymeric matrix may comprise at least about 10 wt % melamine formaldehyde, and can be about 23 wt % melamine formaldehyde in some instances. The polymeric matrix can comprise polyvinylidene fluoride in 1-methyl-2-pyrrolydinone. The pressure sensitive material can have a conductivity of about 0.01 µS/cm to about 1300 µS/cm and a sensitivity of about 0.01 µS/lb to about 300 µS/lb (about 0.02 µS/kg to about 660 µS/kg), and in some cases between about 250 µS/lb and about 300 µS/lb (about 550 µS/kg and about 660 µS/kg), over a temperature range of from about 80° F. to about 220° F. (about 27° C. to about 105° C.), and in certain embodiments, over a temperature range of from about 50° F. to about 350° F., about 400° F., or about 420° F. (about −45° C. to about 176° C., about 205° C., or about 216° C.) or greater.

The fluent pressure sensitive ink, as well as the fluent conductive and dielectric materials, can further include organic solvents in some cases. Appropriate solvents and polymer concentrations therein can vary, depending upon the materials and use conditions. Such solvent and concentrations can readily be selected by those of ordinary skill in the art. Examples of suitable solvents include, but are not limited to, ketones such as methyl ethyl ketone, glycol ethers, glycol ethyl esters such as butyl cellosol acetate and dipropylene glycol monomethyl ether. Further examples include dipropylene glycol monomethyl ether, butyl carbitol acetate, cellosol acetate, diethylene glycol ethyl ether, diethylene glycol diethyl ether, ethylene glycol butyl ether, ethylene glycol butyl acetate, methyl ethyl ketone, toluene, gamma butyrolactone, dimetyl succinate, dimetyl glutarate, and dimetyl adipate. Other solvents which may be suitable, for example, for use with polyimides, include, but are not limited to, N-methyl-2-pyrrolidinone (NMP), dimethyl sulfoxide (DMSO), N,N-dimethylacetamide (DMAC), N,N-dimethyl formaldehyde (DMF), and dimethyl-2-piperidone (DMPD). The polymer percent by weight of solutions used are typically in the range of from about 15% to about 40%, and can be from about 25% to about 35% in some embodiments. The amount of solvent utilized can vary depending on, among other factors, the degree to which the solvent affects processability, physical properties, cost, shelf-life, etc. One of ordinary skill in the art will be able to determine the appropriate amount of solvent relative to such factors.

In one or more embodiments according to the present invention, the pressure sensitive device further comprises an adhesive material or layer(s), securing segments of the pressure sensitive device. For example, the pressure sensitive device can be folded to form a sandwich structure enclosing the pressure sensitive layer between outer layers of nonconductive substrate layers (see FIG. 3). The adhesive material serves to secure and bond together the laminated layers of the folded sandwich structure. Examples of materials potentially suitable for use as or in the adhesive used to secure the folded layers of the pressure sensitive device can include, but are not limited to, thermoplastic rubber, natural rubber, synthetic rubber such as those based on polyisoprene, polybutadiene, polyisobutylene, polyurethane, polychloroprene, polysiloxane, or copolymers or blends thereof. Other potentially suitable materials include those based on butyl rubber, styrene-butadiene rubber, styrene-butadiene-styrene rubber, styrene-isoprene-styrene rubber, polyvinyl ether, acrylic, silicon rubbers, or silicon adhesives, as well as combinations thereof. In some cases, high temperature adhesive films may be used, including those commercially available, for example, 3M high temperature adhesive transfer tapes or DuPont polyimide tapes. Selection of a particular suitable adhesive can depend on several factors, such as thermal stability, chemical compatibility with other components, as well as factors related to fabrication, such as ease of application or cost. In one or more embodiments of the present invention, the adhesive material comprises a synthetic rubber that provides pressure sensitive adhesion, and can be blended with one or more of a silane, such as a thermosetting polycondensed silane, and/or a silane coupling agent. The ratio of the rubber to silane can be varied in accordance with the particular application contemplated and can be selected depending on, among other factors, the adhesive strength required, and/or the stability at the desired operating temperatures. For example, a higher relative amount of rubber can be used if a relatively greater adhesive strength is desirable, or a higher relative amount of silane can be used for higher operating temperature stability. The adhesive material can be applied or used in the devices of the present invention by utilizing techniques known in the art such as, but not limited to, screen printing or solid films deposition. Those of ordinary skill in the art would also recognize that other additives can be further used in the adhesive material such as, but not limited to, antifoaming agents, viscosity modifiers, pigments, processing aids, antioxidant compounds, antiozonant compounds, etc., for example, to modify or improve the processability or other properties of the adhesive material. In another set of embodiments, the sensor halves may be positioned relative to each other using techniques such as ultrasonic welding, crimping, riveting, or other mechanical fastening techniques that are known to those of ordinary skill in the art.

In accordance with one or more embodiments, the present invention provides method of fabricating a pressure sensitive device. The method can comprise steps of providing a non-conductive supporting substrate, depositing a first electrical conductor and a second electrical conductor on a portion of the substrate, and depositing a pressure sensitive layer on the substrate in electrical communication with the first and second electrical conductors. The pressure sensitive layer may comprise one or more of the above described pressure sensitive materials. The step of depositing the pressure sensitive material can comprise applying a pressure sensitive ink to the supporting substrate, and precuring the pressure sensitive ink at a temperature between about 120° F. and about 250° F. (about 49° C. and about 121° C.) for about 1 minute to 10 minutes, and in one embodiment, at about 212° F. (about 100° C.) for about 3 minutes. The step of depositing the pressure sensitive material can further comprise a step of curing the precured pressure sensitive ink at a temperature between about 350° F. and about 600° F. (about 170° C. and about 315° C.) for about 5 minutes to 60 minutes, and in one embodiment, at a temperature of about 440° F. (about 227° C.) for about 20 minutes. The step of depositing the conductors can comprise applying a conductive ink to the supporting substrate and curing the first and second electrical conductors at a suitable temperature for a sufficient time. In one embodiment, the curing is performed at about 302° F. (about 150° C.) for about 5 minutes.

In accordance with one or more embodiments, the present invention provides a method of determining a magnitude of a force applied to a pressure sensitive device. The method includes a step of curing a pressure sensitive ink on at least a portion of the pressure sensitive device. The pressure sensitive ink may have a polymeric matrix comprising carbon nanoparticles dispersed therein. The solidified pressure sensitive ink may have a conductivity of between about 0.01 µS/cm to about 1300 µS/cm, and in certain embodiments, about 200 µS/cm to about 1 mS/cm, with a sensitivity of about 0.01 µS/lb to about 300 µS/lb (about 0.02 µS/kg to about 660 µS/kg), and in some cases between about 250 µS/lb and about 300 µS/lb (about 550 µS/kg and about 660 µS/kg), over a temperature range of from about 80° F. to about 220° F. (about 27° C. to about 105° C.), and in certain embodiments, over a temperature range of from about 50° F. to about 350° F., about 400° F., or about 420° F. (about −45° C. to about 176° C., about 205° C., or about 216° C.) or greater. A resultant conductivity may be measured across the solidified pressure sensitive ink when a force is applied to the pressure sensitive device. The method can further include, in some cases, a step of correlating the measured conductivity against a calibration reference defining an applied force to conductivity relationship of the pressure sensitive device to establish the magnitude of the applied force.

The pressure sensitive layer 10 can include conductive and/or semiconductive particles 12 which can be, for example, carbon black nanoparticles or powder having average particle sizes ranging from about 1 nanometer to about 1,000 nanometers. In certain embodiments, the particles may have an average particle size of from about 13 nanometers to about 75 nanometers in diameter, and, in some cases having an average particle size of from about 15 nanometers to about 45 nanometers. The surface areas of the particles can range, in some cases, from about 25 m$^2$/g to about 560 m$^2$/g and, in certain embodiments, from about 240 m$^2$/g to about 265 m$^2$/g, with densities in the range of from about 6 lb/ft$^3$ to about 18 lb/ft$^3$ (about 96.1 kg/m$^3$ to about 288 kg/m$^3$) and, in some embodiments, about 6 lb/ft$^3$ to about 7 lb/ft$^3$ (about 96.1 kg/m$^3$ to about 112 kg/m$^3$. In some cases, the conductive particles are dispersed in layer 10 in an amount of from about 1% to about 30% by weight of the polymeric binder and particle combination. In certain embodiments, some or all of the particles can be uniformly distributed through the elastomeric binder or matrix. In some cases, at least some of the particles may be nanoparticles, i.e. the particles may have an average particle size less than or equal to about 1000 nanometers. In some cases, a small amount, such as up to 2% by weight, of larger size particles may be used, alone or in combination with differently sized particles, including nanoparticles. The extent of loading, i.e. concentration, of the particles can vary depending on the particular physical properties desired as would be understood by those of ordinary skill in the art. For example, for increased conductivity, a high loading may be used in either or both of the conductive layer and the pressure sensitive layer. That is, to tailor the sensitivity and/or the conductive or resistive output per force applied, the relative concentration of one or more of the polymeric matrix and the conductive carbon particle would be adjusted. It is also believed that the degree to which carbon black particles render an elastomeric matrix electrically conductive can be influenced by its physical and chemical properties, as well as content. In a polymeric matrix rendered conductive by carbon black loading, it is believed that electrons flow through a carbon black/polymer composite when the carbon black particles form a conductive network within the matrix, and that the surface area and the structure typically can influence the degree of conductivity imparted.

Semiconductive or conductive grade carbon black particles can be used in certain embodiments if desired. Such carbon black particles are commercially available from, for example, Cabot Corp., Billerica, Mass. and Degussa Corp., Ridgefield Park, N.J. Such carbon particles can be utilized because of their semiconductive properties. Conductive and semiconductive particles useful or potentially useful in this invention include, but are not limited to, the above-described semiconductive particles, as well as particles based on antimony, silicon, magnetite, graphite, molybdenum, sulfide, carborundum, lead sulfide, ferrous sulfide, compounds of iron with carbon, phosphor and others, as well as combinations of these and/or other materials. Nanoparticles, fillers, or other agents able to modify one or more physical characteristics, such as silica, talc, benton, or the like, can also be used.

In certain embodiments, the conductivity of the pressure sensitive material can be tailored to range from about 0.01 µS/cm to about 1300 µS/cm, typically about 200 µS/cm to about 1 mS/cm over a temperature range of from about 80° F. to about 220° F. (about 27° C. to about 105° C.), and in certain embodiments, over a temperature range of from about −50° F. to about 350° F., about 400° F., or about 420° F. (about −45° C. to about 176° C., about 205° C., or about 216° C.) or greater. The pressure sensitive material can also be tailored to provide a force sensitivity that can range from about 0.01 µS/lb to about 300 µS/lb (about 0.02 µS/kg to about 660 µS/kg), and in some cases between about 250 µS/lb and about 300 µS/lb (about 550 µS/kg and about 660 µS/kg).

Colloid systems of the pressure sensitive inks of this invention can be formed in conventional manners in some cases. An appropriate solvent, e.g. as described above, can be mixed with a selected polymer binder, such as those describe previously, after which the filler of nanoparticles can be dispersed in the binder utilizing conventional mixing techniques, until a suitable colloid system is formed. An initial colloid system so formed can act as a master batch in some instances, with additional binder and/or particles being blended with the master batch to achieve a pressure sensitive ink having a desired set of properties.

In certain embodiments, the pressure sensitive ink can be formed into solidified components of a pressure sensitive device by conventional drying and/or curing techniques, such as those described herein. The inks can be silk screened, doctor coated, sprayed, jet printed, or applied in other conventional ways to a substrate surface. In some cases, to facilitate application of the ink to the substrate, the ink may have a viscosity of at least about 3,000 centipoise at about 70° F. (about 21° C.). The inks, in some cases, can be deposited as a thin layer of ink, in a predetermined pattern, on a selected surface and then dried or cured as described. Ink layers of from about 0.00015 inches to about 0.00045 inches (about 3.8 micrometers to about 11.4 micrometers) dried thickness are utilized in certain pressure sensitive devices of this invention, although layers of other thicknesses can potentially also be used. One or more layers can be used, depending upon the device. In some cases, the layers can be molded. The term "layer," as used herein, also includes shapes such as cylinders, rectangles, squares, or other shapes as may be required for a specific application. Drying can be carried out, in certain cases, just above the evaporation temperature of the solvent for a period of time necessary to remove the solvent and solidify the layer. In some cases, the heat of drying can also provide a curing action and/or induce polymerization of inks comprising the monomers or pre-polymers described above.

The invention can be further understood through the following examples, which are illustrative in nature and do not limit the scope of the invention.

Example 1

This example illustrates a pressure sensitive material in accordance with one or more embodiments of the present invention, including a PMDA-ODA based pressure sensitive ink. This ink was prepared by dissolving 100 grams (0.64 moles) of 4,4'-oxydiamine in 500 grams of 1-methyl-2-pyrrolydinone at room temperature, under an argon atmosphere. While stirring at room temperature, a solution of 138.90 g (0.64 moles) of pyromellitic dianhydride was added dropwise to the 1-methyl-2-pyrrolydinone/diamine mixture. The solution was stirred at room temperature under argon for about one hour to yield a red color resin. The resulting reaction material is a polyamic acid resin intermediate that was transferred into a glass container and refrigerated at 0° C. About 15 grams of a conductive particle such as conductive carbon black powder, available from Cabot Corporation, Billerica, Mass., was then introduced into about 200 grams of the polyamic acid resin, until all the carbon black particles were incorporated. The carbon black particles were dispersed in the material, by utilizing a laboratory disperser at 2000 RPM for 6 minutes. To tailor the sensitivity and/or the conductive or resistive output per force applied, the relative concentration of one or more of the polyamic acid resin and the conductive carbon particle could be adjusted.

In another embodiment according to the present invention, commercially available polyamic acid materials can be used for making the pressure sensitive ink, where a carbon black powder is incorporated therein at a various concentrations, depending on the desired sensitivity and/or conductivity.

Example 2

This example illustrates the preparation of certain pressure sensitive sensors of the invention. Each of the sensors fabricated in this example used a conductive ink formulation of about 20 wt % solvent of dipropylene glycol monomethyl ether, about 7.5 wt % polyhydroxy ether resin with about 23 wt % melamine formaldehyde crosslinker, and about 72.5 wt % silver particles. The conductive ink was laid to have a thickness of about 0.25 mils (about 6.4 micrometers). The conductive ink was cured at 302° F. (150° C.) for 5 minutes.

A prior art pressure sensitive device, used as a comparison and designated as a "Standard TK Sensor," was prepared utilizing a pressure sensitive ink made of 9 wt % of conductive carbon nanoparticles dispersed in polyhydroxy ether resin. This pressure sensitive ink was cured at 285° F. (141° C.) for 3 minutes. The Standard TK Sensor was tested in a laboratory tester with a maximum applied force of about 4.5 lb (about 2 kg). The pressure sensitive ink comprised about 72 wt % solvent dipropylene glycol monomethyl ether solvent, about 25.5 wt % polyhydroxy ether resin, and about 2.5 wt % carbon black particles, as described in U.S. Pat. No. 5,989, 700.

A pressure sensitive device according to the present invention, designated as a "Polyimide Sensor," was also fabricated. The pressure sensitive ink of the Polyimide Sensor contained about 1.6 wt % conducting carbon black particles dispersed in polyamic acid resin. The pressure sensitive ink was cured at 440° F. (about 227° C.) for about 20 minutes. The polyimide ink comprised about 80 wt % 1-methyl-2-pyrrolydinone solvent, about 18.4 wt % polyamic acid resin, and about 1.6 wt % conducting carbon black particles.

Figure 4:
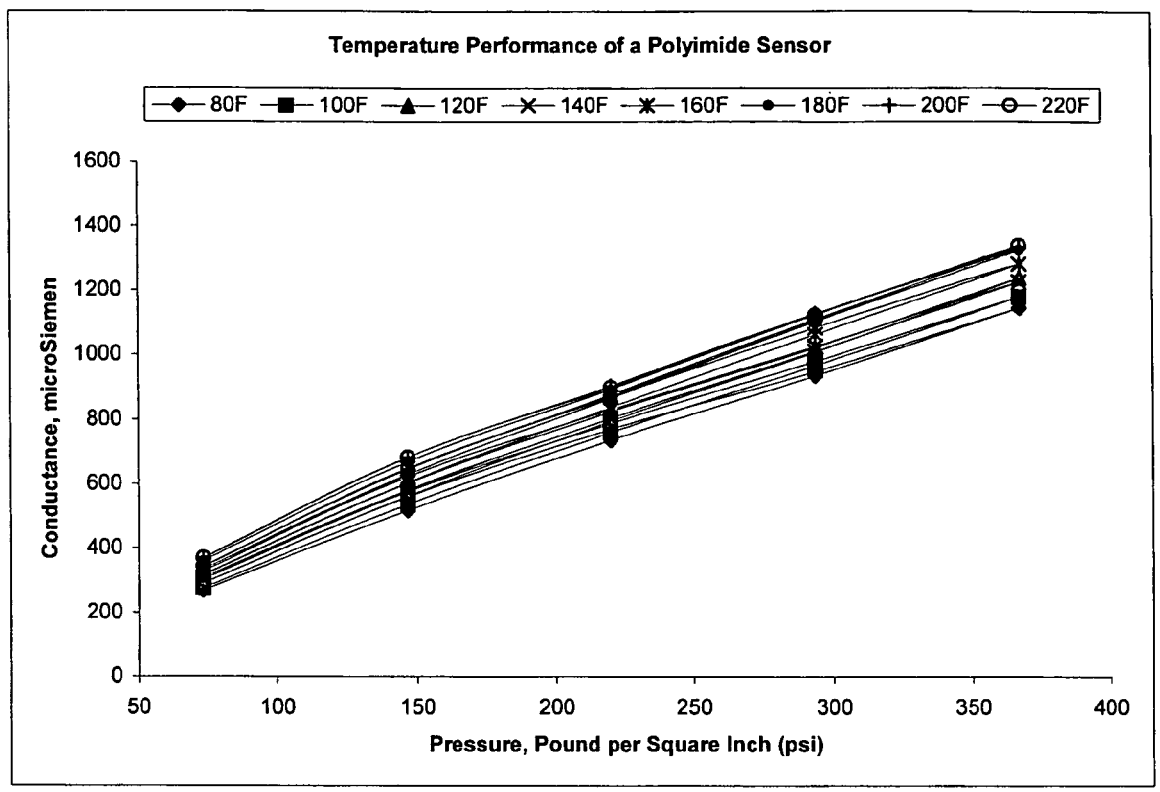
FIG. 4 is graph showing conductivity as function of applied pressure of a polyimide pressure sensitive material-based pressure sensitive device at various temperatures, according to one or more embodiments of the invention.

The sensors were tested in a laboratory tester at various applied loads from 0.9 lb (about 0.4 kg) to a maximum applied force of about 4.5 lb (about 2 kg) at various temperatures. Table 1 lists the measured conductivity of the Polyimide Sensor. The data is graphically shown in FIG. 4. The data shows that the Polyimide Sensor can be predictably used at temperatures up to 220° F. (about 104° C.). The applied voltage was about 5 V.

Table 1. Conductance (µS/cm) of the Polyimide Sensor at Various Temperatures.

TABLE 1

Conductance (µS/cm) of the Polyimide Sensor at Various Temperatures.

| Force, lb | Pressure, psi | 80° F. | 100° F. | 120° F. | 140° F. | 160° F. | 180° F. | 200° F. | 220° F. |
|---|---|---|---|---|---|---|---|---|---|
| 0.9 | 73 | 269 | 276 | 292 | 309 | 318 | 335 | 342 | 345 |
| 1.8 | 147 | 518 | 537 | 562 | 581 | 605 | 630 | 646 | 645 |
| 2.7 | 220 | 735 | 759 | 794 | 802 | 836 | 864 | 876 | 871 |
| 3.6 | 293 | 935 | 967 | 1008 | 1011 | 1063 | 1103 | 1111 | 1106 |
| 4.5 | 367 | 1145 | 1180 | 1238 | 1226 | 1282 | 1326 | 1332 | 1339 |
| 3.6 | 293 | 948 | 979 | 1022 | 1026 | 1084 | 1126 | 1129 | 1124 |
| 2.7 | 220 | 769 | 787 | 823 | 829 | 868 | 892 | 902 | 897 |
| 1.8 | 147 | 559 | 576 | 602 | 623 | 649 | 669 | 682 | 683 |
| 0.9 | 73 | 291 | 303 | 315 | 328 | 344 | 361 | 369 | 371 |

Figure 5:
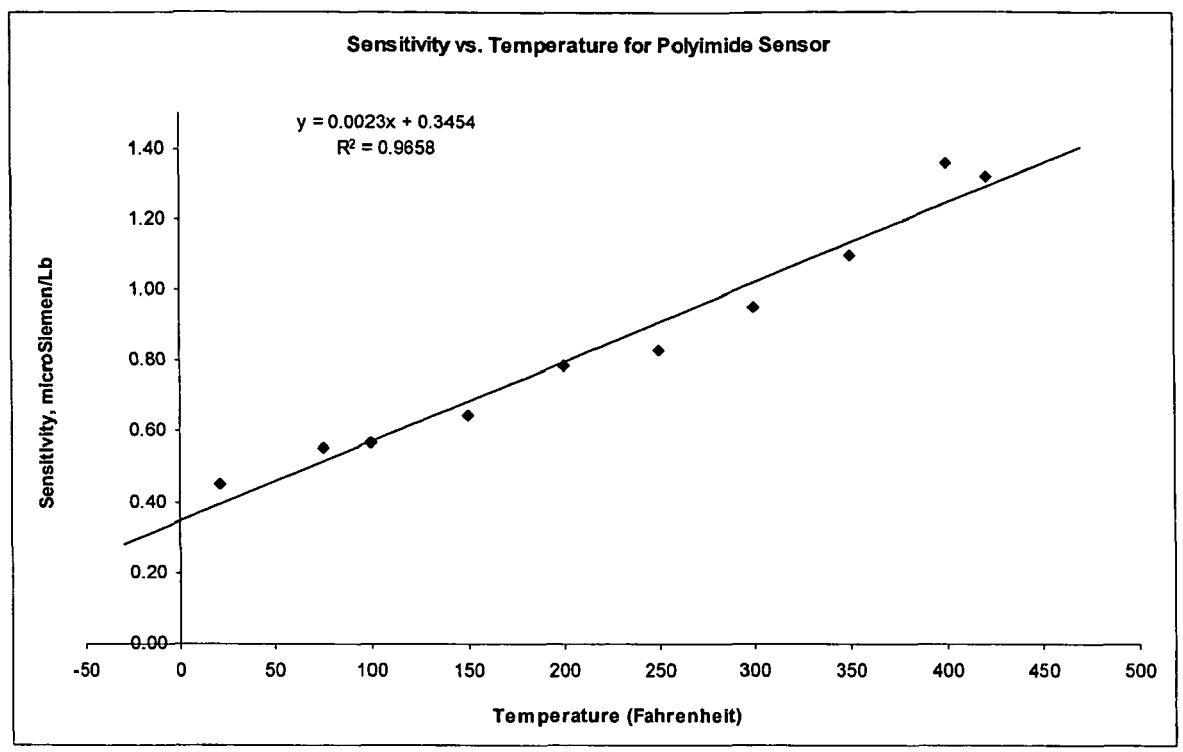
FIG. 5 is a graph showing sensitivity as a function of temperature of a polyimide-based pressure sensitive device, according to one or more embodiments of the invention.

Table 2 list the calculated sensitivity of the Polyimide Sensor at various temperature. This data is graphically illustrated in FIG. 5, and shows the performance of a predictable, stable sensor over a broad temperature range.

TABLE 2

Sensitivity (µS/lb) of the Polyimide Sensor at Various Temperatures.

| Temperature, F. | Sensitivity, µS/lb |
|---|---|
| 21 | 0.45 |
| 75 | 0.55 |
| 100 | 0.57 |
| 150 | 0.65 |
| 200 | 0.79 |
| 250 | 0.83 |
| 300 | 0.95 |
| 350 | 1.10 |
| 400 | 1.36 |
| 420 | 1.32 |

Figure 6:
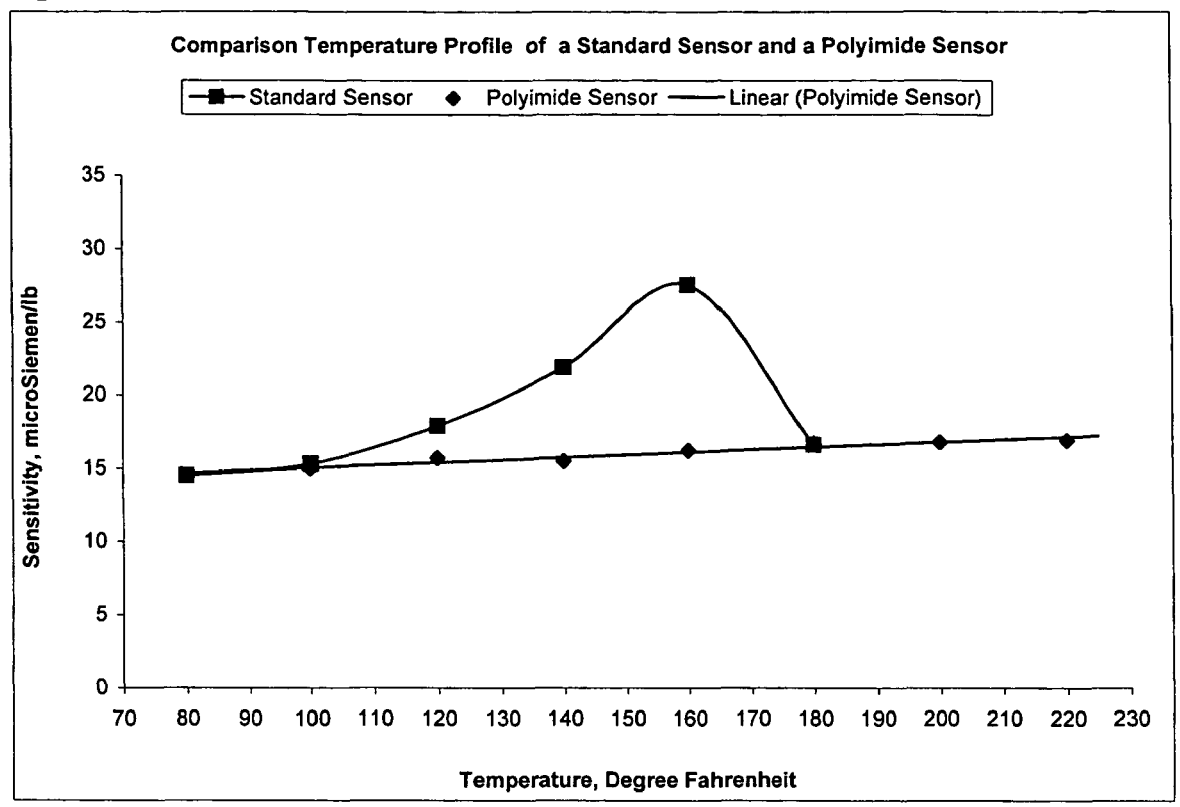
FIG. 6 is graph showing sensitivity as a function of temperature of a polyimide-based pressure sensitive device, according to one or more embodiments of the invention, as well as the sensitivity of a standard pressure sensitive device known in the art.

Table 3 lists the calculated sensitivity (µS/lb) of the Standard TK Sensor as well as the calculated sensitivity of the Polyimide Sensor at various test temperatures. This data is also presented graphically in FIG. 6 and shows that the Polyimide Sensor generally has a more stable, predictable response than the Standard TK Sensor.

TABLE 3

Calculated Sensitivity (µS/lb) of the Standard TK Sensor and the Polyimide Sensor at Various Temperatures and Normalized Sensitivity of the Polyimide Sensor relative to the Standard TK Sensor.

| | | | As Normalized to Standard TK Sensor | | |
|---|---|---|---|---|---|
| Temperature, ° F. | Standard TK Sensor | Polyimide Sensor | Temperature, F. | Standard TK Sensor | Polyimide Sensor |
| 80 | 14.5 | 254 | 80 | 14.5 | 14.5 |
| 100 | 15.3 | 262 | 100 | 15.3 | 15.0 |
| 120 | 17.9 | 275 | 120 | 17.9 | 15.7 |
| 140 | 21.9 | 272 | 140 | 21.9 | 15.5 |
| 160 | 27.5 | 284 | 160 | 27.5 | 16.2 |
| 180 | 16.6 | 293 | 180 | 16.6 | 16.7 |
| 200 | — | 294 | 200 | — | 16.8 |
| 220 | — | 296 | 220 | — | 16.9 |

Figure 7:
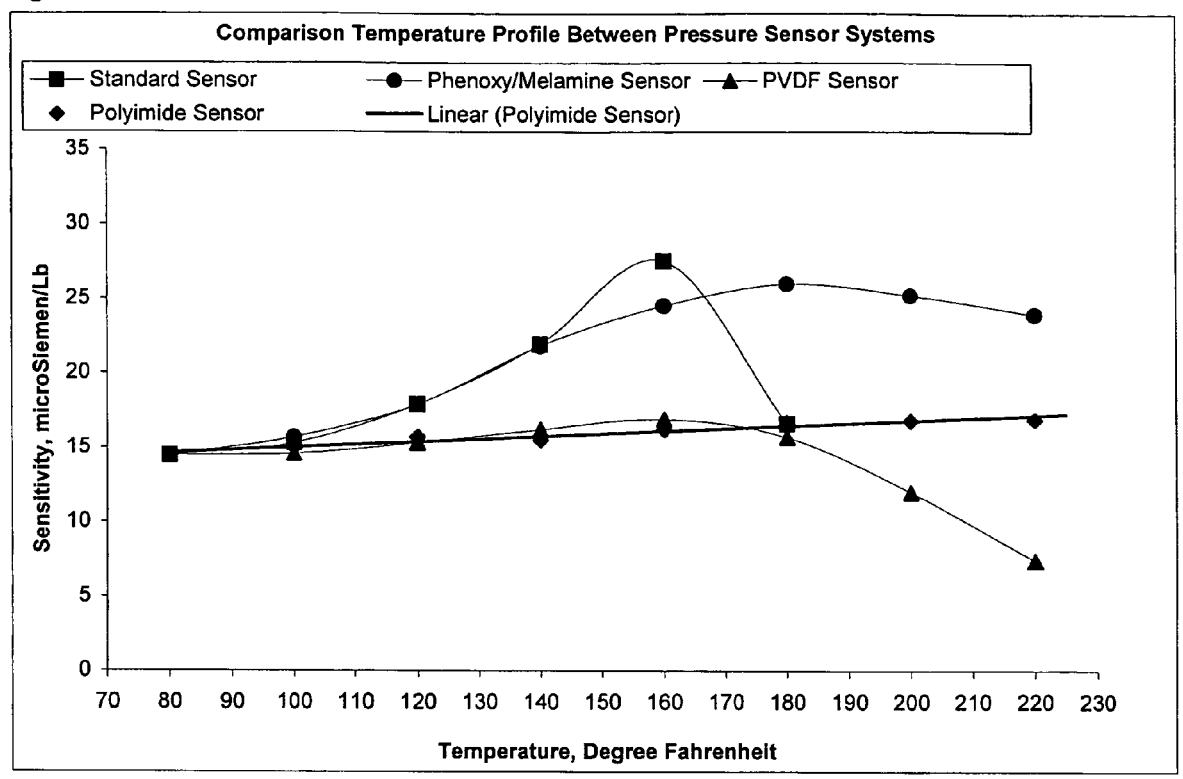
FIG. 7 is a graph showing sensitivity as a function of temperature of various high temperature capable pressure sensitive device, according to one or more embodiments of the invention.

Table 4 lists the calculated sensitivity of the Standard TK Sensor and the Polyimide Sensor ("Sensor C") as well as a phenoxy/melamine ink-based sensor and a PVDF ink-based sensor according to the present invention. The phenoxy/melamine ink-based sensor ("Sensor A") was prepared in substantially the same fashion as the Standard TK sensor, except that the binder comprised 77 wt % of polyhydroxy ether resin and 23 wt % melamine formaldehyde resin. The PVDF ink-based sensor ("Sensor B") was also prepared in substantially the same fashion as the Standard TK sensor, except for the use of polyvinylidene fluoride dissolved in 70 wt % of 1-methyl-2-pyrrolydinone with 2.5 wt % carbon black particles. The PVDF ink was cured at 150° F. (about 66° C.) for 24 hours. The data, also presented graphically in FIG. 7, show that the high temperature stable pressure sensitive devices in accordance with the present invention can be used to fabricate a pressure sensitive device that provides a predictable stable response at temperatures greater than about 150° F. (about 66° C.).

TABLE 4

Calculated Sensitivity (µS/lb) of Several Sensor at Various Temperatures.

| Temp ° F. | Standard TK Sensor Phenoxy Ink | Sensor A Phenoxy/Melamine Ink | Sensor B PVDF Ink | Sensor C Polyimide Ink |
|---|---|---|---|---|
| 80 | 14.5 | 1.10 | 28.8 | 254 |
| 100 | 15.3 | 1.19 | 28.9 | 262 |
| 120 | 17.9 | 1.36 | 30.3 | 275 |
| 140 | 21.9 | 1.65 | 32.2 | 272 |
| 160 | 27.5 | 1.86 | 33.6 | 284 |
| 180 | 16.6 | 1.97 | 31.2 | 293 |
| 200 | — | 1.91 | 23.8 | 294 |
| 220 | — | 1.81 | 14.6 | 296 |

Sensitivity as Normalized to Standard TK Sensor

| Temp °F. | Standard TK Sensor Phenoxy Ink | Sensor A Phenoxy/Melamine Ink | Sensor B PVDF Ink | Sensor C Polyimide Ink |
|---|---|---|---|---|
| 80 | 14.5 | 14.5 | 14.5 | 14.5 |
| 100 | 15.3 | 15.7 | 14.6 | 15.0 |
| 120 | 17.9 | 17.9 | 15.3 | 15.7 |
| 140 | 21.9 | 21.8 | 16.2 | 15.5 |
| 160 | 27.5 | 24.5 | 16.9 | 16.2 |
| 180 | 16.6 | 26.0 | 15.7 | 16.7 |
| 200 | — | 25.2 | 12.0 | 16.8 |
| 220 | — | 23.9 | 7.4 | 16.9 |

Figure 8:
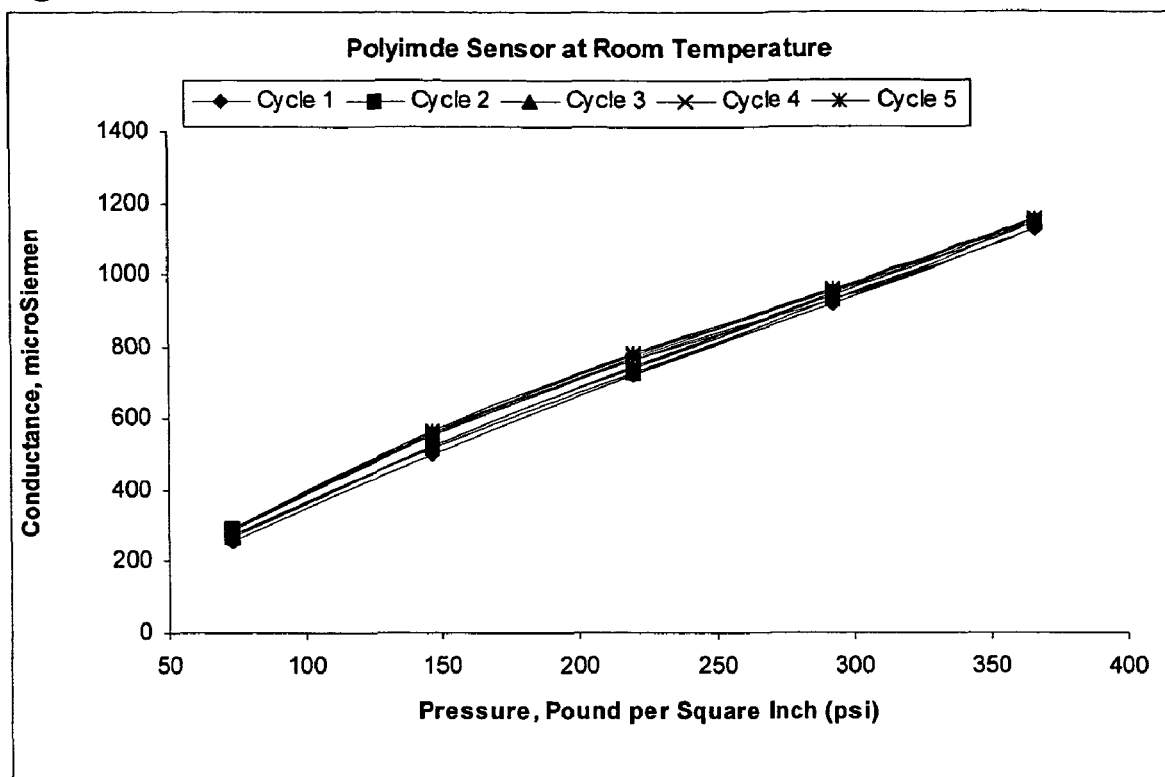
FIG. 8 is a graph showing the conductivity through several loading cycles at room temperature of a polyimide pressure sensitive material-based pressure sensitive device, according to one or more embodiments of the invention.

Table 5 lists the measured conductivity of the Polyimide Sensor through several loading cycles at room temperature. This data is also presented graphically in FIG. 8 and shows that the Polyimide Sensor can undergo repeated loading cycles without significant degradation. In Table 5, hysterisis is defined as the percentage of the maximum difference in sensor output between the load and unload sequences. For example, the first cycle: hysterisis was calculated as 100%× (555−502)/555=9.5%. Also in Table 5, "Rep at Peak Load" is defined as the percentage of the sensor change in output from the peak load at first cycle to the peak load of subsequent cycles. For example, in the fourth cycle, the repeatability at peak load was calculated as 100%×(1150−1123)/ 1123=2.4%.

Table 5. Measured conductivity (µS/cm) of the Polyimide Sensor at Room Temperature.

TABLE 5

Measured conductivity (µS/cm) of the Polyimide Sensor at Room Temperature.

| Force, lb | Pressure, psi | Cycle 1 | Cycle 2 | Cycle 3 | Cycle 4 | Cycle 5 | Average |
|---|---|---|---|---|---|---|---|
| 0.9 | 73 | 259 | 269 | 272 | 272 | 272 | 269 |
| 1.8 | 147 | 502 | 518 | 523 | 524 | 525 | 518 |
| 2.7 | 220 | 720 | 726 | 737 | 743 | 747 | 735 |
| 3.6 | 293 | 917 | 930 | 939 | 942 | 948 | 935 |
| 4.5 | 367 | 1123 | 1142 | 1156 | 1150 | 1154 | 1145 |
| 3.6 | 293 | 932 | 944 | 951 | 955 | 958 | 948 |
| 2.7 | 220 | 760 | 765 | 768 | 774 | 778 | 769 |
| 1.8 | 147 | 555 | 557 | 560 | 560 | 564 | 559 |
| 0.9 | 73 | 286 | 293 | 294 | 293 | 291 | 291 |
| Sensitivity µS/lb | | 249 | 253 | 257 | 255 | 256 | 254 |
| Hysterisis % | | 9.5 | 7.8 | 6.9 | 6.7 | 7.1 | 7.6 |
| Linearity | | 1.16 | 1.20 | 1.20 | 1.19 | 1.19 | 1.19 |
| Rep at Peak Load % | | | 1.7 | 3.0 | 2.4 | 2.8 | |

Figure 9:
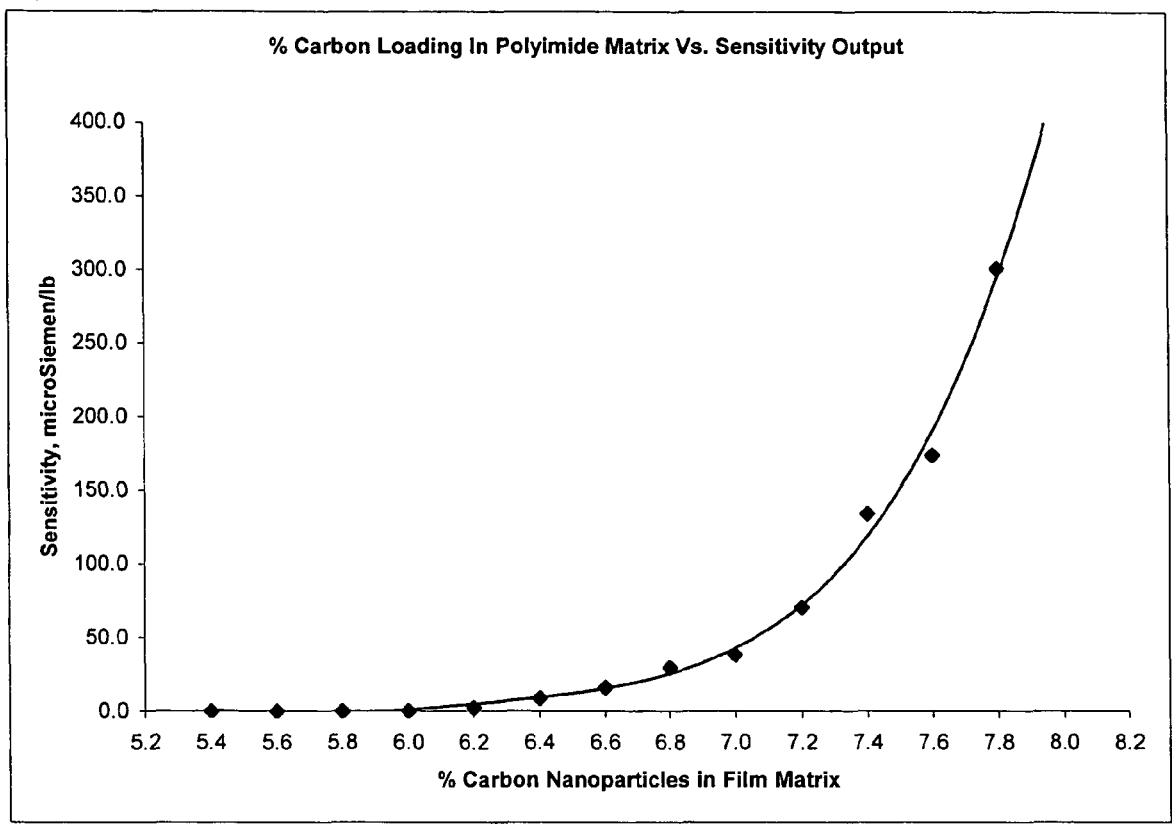
FIG. 9 is a graph showing sensitivity as a function of the percentage of carbon nanoparticles in the film matrix, according to one or more embodiments of the invention.

Table 6 lists carbon dispersed in a polyimide matrix vs. the recorded sensitivity of the sensor, in another experiment using a polyimide sensor. The applied force was about 366 psi. This data is also presented graphically in FIG. 9.

TABLE 6

Carbon Dispersed into Polyimide Matrix vs. Recorded Sensitivity of the Sensor.

| % carbon in matrix | Sensitivity, microSiemen/lb |
|---|---|
| 5.4 | 0.00 |
| 5.6 | 0.01 |
| 5.8 | 0.03 |
| 6.0 | 0.18 |
| 6.2 | 2.09 |
| 6.4 | 8.81 |
| 6.6 | 15.9 |
| 6.8 | 29.5 |
| 7.0 | 38.4 |
| 7.2 | 70.4 |
| 7.4 | 134 |
| 7.6 | 174 |
| 7.8 | 301 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, concentrations, materials, and configurations described herein are meant to be exemplary and that the actual parameters, dimensions, concentrations, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one act, the order of the acts of the method is not necessarily limited to the order in which the acts of the method are recited.

As used herein in the specification and in the claims, the term "at least one," in reference to a list of elements, should be understood to mean at least one element selected from any one or more of the elements in the list of elements, but not necessarily including at least one of each and every element specifically listed within the list of elements and not excluding any combinations of elements in the list of elements. Similarly, the term "or combinations thereof," in reference to a list of elements, should be understood to mean that one or more elements may be selected from the list of elements, but not necessarily including at least one of each and every element specifically listed within the list of elements and not excluding any combinations of elements in the list of elements. These definitions also allow that elements may optionally be present other than the elements specifically identified within the list of elements that the phrase "at least one" or "or combinations thereof" refer to, whether related or unrelated to those elements specifically identified. Thus, as a non-limiting example, "A and B or combinations thereof" (or, equivalently, "A and B and combinations thereof," "at least one of A and B," "at least one of A or B," "at least one of A and/or B," etc.) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," "made of," "formed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A pressure sensitive device configured to function as a pressure or force sensor, comprising:
    a nonconducting supporting substrate; and
    a pressure sensitive material supported by the substrate, comprising conductive carbon nanoparticles dispersed in a polymeric matrix comprising a product of a polycondensation reaction of a dianhydride and a diamine, wherein the dianhydride is selected from the group consisting of pyromellitic dianhydride, 1,2,4,5 tetracarboxylic benzene dianhydride, 3,4,3',4'-benzophenone tetracarboxylic dianhydride, 3,4,3',4'-biphenyl tetracarboxylic dianhydride, terphenyl tetracarboxylic dianhydride, 3,3',4,4'-oxydiphthalic dianhydride, 2,2'-bis[4-(3,4-dicarboxyphenoxy)phenyl]propane dianhydride, 3,3',4,4'-diphenylsulfone tetracarboxylic dianhydride, bis(3,4-dicarboxyphenyl)dimethylsilane dianhydride, 4,4'-(2,2,2-trifluoro-1-phenylethylidene)diphthalic anhydride, 5,5'-[2,2,2-trifluoro-1-(trifluoromethyl)ethylidene]bis-1,3-isobenzenefurandione, 3,4,3',4'-biphenyltetracarboxylic benzene dianhydride, or combinations thereof, and wherein the diamine is selected from the group consisting of 4,4'-oxydiamine, 4,4'-diamino diphenyl, 4 amino phenyl ether, 4,4'-methylenedianiline, 4,4'-diamino diphenyl methane, meta-phenyl diamine, 1,3-phenylene diamine, 1,4-phenylene diamine, isophorone diamine, (1,1'-biphenyl)-4,4'-diamine, durene diamine, 2,3,5,6-tetramethylphenylenediamine, 1,3-bis(3-aminophenoxy)benzene, 1,3-bis(4-aminophenoxy)benzene, or combinations thereof; and
    wherein the pressure sensitive material has a conductivity falling within a range of about 0.01 μS/cm to about 1300 μS/cm and a sensitivity falling within a range of about 0.01 μS/lb to about 300 μS/lb over the entire temperature range of about −50° F. to about 350° F.

2. The pressure sensitive device as set forth in claim 1, wherein the polymeric matrix is selected from the group consisting of a reaction product of pyromellitic dianhydride and 4,4'-oxydiamine, a reaction product of 3,4,3',4'-biphenyl tetracarboxylic dianhydride and 4,4'-oxydiamine, a reaction product of 3,4,3',4'-biphenyl tetracarboxylic dianhydride and 4,4'-methylenedianiline, a reaction product of terphenyl tetracarboxylic dianhydride and 4,4'-methylenedianiline, a reaction product of 3,3',4,4'-oxydiphthalic dianhydride and 4,4'-oxydiamine, a reaction product of 3,4,3',4'-biphenyltetracarboxylic benzene dianhydride and 4,4'-oxydiamine, a reaction product of 3,4,3',4' biphenyltetracarboxylic benzene dianhydride and 4,4'-methylenedianiline, a reaction product of pyromellitic dianhydride and 1,3-phylene diamine, a reaction product of 3,4,3',4'-biphenyltetracarboxylic benzene dianhydride and 1,3-phylene diamine, a reaction product of pyromellitic dianhydride and meta-phenyl diamine, and combinations thereof.

3. The pressure sensitive device as set forth in claim 1, wherein the supporting substrate comprises polyimide.

4. The pressure sensitive device as set forth in claim 1, further comprising a conductive lead in electrical communication with the pressure sensitive material and supported by the substrate, the conductive lead comprising electrically conductive metal dispersed in a binder.

5. The pressure sensitive device as set forth in claim 4, wherein the conductive lead comprises silver particles dispersed in a polyhydroxyether crosslinked with a crosslinker compound.

6. The pressure sensitive device as set forth in claim 5, wherein the polyhydroxyether is selected from the group consisting of a phenoxy compound, an epoxy composition, an acrylic polyol compound, hydroxyl-functional polyester compound, a hydroxyl-functional polyether compound, a polyvinyl butyral compound, a polyvinyl alcohol compound, or combinations thereof.

7. The pressure sensitive device as set forth in claim 1, wherein the polymeric matrix further comprises fumed silica dioxide as a filler.

8. The pressure sensitive device as set forth in claim 1, wherein the pressure sensitive material further comprises a dielectric material comprising a phenoxy resin.

9. The pressure sensitive device as set forth in claim 1, further comprising an adhesive layer disposed to secure the pressure sensitive device in a folded assembly.

10. The pressure sensitive device as set forth in claim 1, wherein the pressure sensitive material has a thickness ranging from about 0.2 mil to about 2.0 mil.

11. The pressure sensitive device as set forth in claim 1, wherein said pressure sensitive material has a sensitivity of about 250 μS/lb to about 300 μS/lb.

12. The pressure sensitive device as set forth in claim 1, wherein the pressure sensitive material has a conductivity falling within a range of about 0.01 μS/cm to about 1300 μS/cm and a sensitivity falling within a range of about 250 μS/lb to about 300 μS/lb over the entire temperature range of about −50° F. to about 350° F.

13. The pressure sensitive device as set forth in claim 1, wherein the pressure sensitive material has a conductivity falling within a range of about 0.01 μS/cm to about 1300 μS/cm and a sensitivity falling within a range of about 0.01 μS/lb to about 300 μS/lb over the entire temperature range of about −50° F. to about 420° F.

14. The pressure sensitive device as set forth in claim 13, wherein the sensitivity of the pressure sensitive device as a function of temperature is substantially linear over a temperature range of about 21° F. to about 420° F.

15. The pressure sensitive device as set forth in claim 1, wherein the pressure sensitive material is formed via depositing a layer of a pressure sensitive ink comprising the pressure sensitive material on the substrate, the pressure sensitive ink having a viscosity of at least about 3,000 centipoise at about 70° F.

16. The pressure sensitive device as set forth in claim 1, wherein the carbon nanoparticles are dispersed in the polymeric matrix at a concentration of from about 1 wt % to about 30 wt %, wherein weight percentages are calculated as the total weight of carbon nanoparticles divided by the entire weight of carbon nanoparticles and polymeric matrix together multiplied by 100%.

17. The pressure sensitive device as set forth in claim 16, wherein the pressure sensitive material comprises between about 1 wt % and about 10 wt % of carbon nanoparticles dispersed in a polymeric matrix, wherein weight percentages are calculated as the total weight of carbon nanoparticles divided by the entire weight of carbon nanoparticles and polymeric matrix together multiplied by 100%.

18. A pressure sensitive device configured to function as a pressure or force sensor, comprising:
  a nonconductive supporting substrate comprising a polyimide;
  a conductive lead supported by the substrate, comprising silver particles dispersed in a polyhydroxy ether crosslinked with melamine formaldehyde;
  a pressure sensitive material in contact with the conductive lead and supported by the substrate, comprising conductive carbon nanoparticles dispersed in a polymeric matrix comprising a product of a polycondensation reaction of a dianhydride and a diamine, wherein the dianhydride is selected from the group consisting of pyromellitic dianhydride, 1,2,4,5 tetracarboxylic benzene dianhydride, 3,4,3',4'-benzophenone tetracarboxylic dianhydride, 3,4,3',4'-biphenyl tetracarboxylic dianhydride, terphenyl tetracarboxylic dianhydride, 3,3',4,4'-oxydiphthalic dianhydride, 2,2'-bis[4-(3,4-dicarboxyphenoxy)phenyl]propane dianhydride, 3,3',4,4'-diphenylsulfone tetracarboxylic dianhydride, bis(3,4-dicarboxyphenyl)dimethylsilane dianhydride, 4,4'-(2,2,2-trifluoro-1-phenylethylidene)diphthalic anhydride, 5,5'-[2,2,2-trifluoro-1-(trifluoromethyl)ethylidene]bis-1,3-isobenzenefurandione, 3,4,3',4'-biphenyltetracarboxylic benzene dianhydride, or combinations thereof, and wherein the diamine is selected from the group consisting of 4,4'-oxydiamine, 4,4'-diamino diphenyl, 4 amino phenyl ether, 4,4'-methylenedianiline, 4,4'-diamino diphenyl methane, meta-phenyl diamine, 1,3-phenylene diamine, 1,4-phenylene diamine, isophorone diamine, (1,1'-biphenyl)-4,4'-diamine, durene diamine, 2,3,5,6-tetramethylphenylenediamine, 1,3-bis(3-aminophenoxy)benzene, 1,3-bis(4-aminophenoxy)benzene, or combinations thereof,
  said pressure sensitive material having a conductivity falling within a range of about 0.01 µS/cm to about 1300 µS/cm and a sensitivity falling within a range of about 0.01 µS/lb to about 300 µS/lb over the entire temperature range of about −50° F. to about 350° F.; and
  an adhesive material in contact with the substrate and configured and positioned to secure and bond together multiple layers of the device.

19. The pressure sensitive device as set forth in claim 18, wherein the polymeric matrix is selected from the group consisting of a reaction product of pyromellitic dianhydride and 4,4'-oxydiamine, a reaction product of 3,4,3',4'-biphenyl tetracarboxylic dianhydride and 4,4'-oxydiamine, a reaction product of 3,4,3',4'-biphenyl tetracarboxylic dianhydride and 4,4'-methylenediamine, a reaction product of terphenyl tetracarboxylic dianhydride and 4,4'-methylenediamine, a reaction product of 3,3',4,4'-oxydiphthalic dianhydride and 4,4'-oxydiamine, a reaction product of 3,4,3',4'-biphenyltetracarboxylic benzene dianhydride and 4,4'-oxydiamine, a reaction product of 3,4,3',4' biphenyltetracarboxylic benzene dianhydride and 4,4'-methylenedianiline, a reaction product of pyromellitic dianhydride and 1,3-phylene diamine, a reaction product of 3,4,3',4'-biphenyltetracarboxylic benzene dianhydride and 1,3-phylene diamine, a reaction product of pyromellitic dianhydride and meta-phenyl diamine, and combinations thereof.

20. The pressure sensitive device as set forth in claim 18, further comprising a dielectric material comprising a polyhydroxy ether resin crosslinked with melamine formaldehyde.

21. The pressure sensitive device as set forth in claim 18, wherein said pressure sensitive material has a sensitivity of about 250 µS/lb to about 300 µS/lb.

22. The pressure sensitive device as set forth in claim 18, wherein said pressure sensitive material exhibits a change in sensitivity of about 0.1% per degree Farenheit over at least a portion of said temperature range.

23. The pressure sensitive device as set forth in claim 18, wherein the pressure sensitive material has a conductivity falling within a range of about 0.01 µS/cm to about 1300 µS/cm and a sensitivity falling within a range of about 250 µS/lb to about 300 µS/lb over the entire temperature range of about −50° F. to about 350° F.

24. The pressure sensitive device as set forth in claim 18, wherein the pressure sensitive material has a conductivity falling within a range of about 0.01 µS/cm to about 1300 µS/cm and a sensitivity falling within a range of about 0.01 µS/lb to about 300 µS/lb over the entire temperature range of about −50° F. to about 420° F.

25. The pressure sensitive device as set forth in claim 24, wherein the sensitivity of the pressure sensitive device as a function of temperature is substantially linear over a temperature range of about 21° F. to about 420° F.

26. The pressure sensitive device as set forth in claim 18, wherein the pressure sensitive material is formed via depositing a layer of a pressure sensitive ink comprising the pressure sensitive material on the substrate, the pressure sensitive ink having a viscosity of at least about 3,000 centipoise at about 70° F.

27. The pressure sensitive device as set forth in claim 18, wherein the pressure sensitive material has a thickness ranging from about 0.2 mil to about 2.0 mil.

28. The pressure sensitive device as set forth in claim 18, comprising a first and a second layer of the non-conductive supporting substrate, wherein the conductive lead and pressure sensitive material are each configured as layers positioned between the first and second layers of the non-conductive supporting substrate, and wherein the adhesive material is positioned between the first and second layers of the non-conductive supporting substrate to secure and bond together the first and second layers of the non-conductive supporting substrate of the device.

29. The pressure sensitive device as set forth in claim 18, wherein the adhesive material comprises a synthetic rubber material and a silane coupling agent.

30. A pressure sensitive device configured to function as a pressure or force sensor, comprising:
  a nonconducting supporting substrate; and
  a pressure sensitive material supported by the substrate, comprising conductive carbon nanoparticles dispersed in a polymeric matrix; wherein the polymeric matrix is selected from the group consisting of a polyvinylidene fluoride, a poly(vinylidene fluoride-hexafluoropropylene), a poly(acrylonitrile-butadiene-styrene), a poly (ethylene-2,6-naphthalene dicarbonate), a poly(bisphenol-A carbonate), a polyhydroxy ether resin crosslinked with melamine formaldehyde, or combinations thereof; wherein the pressure sensitive material has a conductivity falling within a range of about 0.01 µS/cm to about 1300 µS/cm and a sensitivity falling within a range of about 0.01 µS/lb to about 300 µS/lb over the entire temperature range of at least about 80° F. to about 220° F.

31. The pressure sensitive device as set forth in claim 30, wherein the supporting substrate comprises polyimide.

32. The pressure sensitive device as set forth in claim 30, further comprising a conductive lead in electrical communication with the pressure sensitive material and supported by the substrate, the conductive lead comprising electrically conductive metal dispersed in a binder.

33. The pressure sensitive device as set forth in claim 32, wherein the conductive lead comprises silver particles dispersed in a polyhydroxyether crosslinked with a crosslinker compound.

34. The pressure sensitive device as set forth in claim 33, wherein the polyhydroxyether is selected from the group consisting of a phenoxy compound, an epoxy compound, an acrylic polyol compound, hydroxyl-functional polyester compound, a hydroxyl-functional polyether compound, a polyvinyl butyral compound, a polyvinyl alcohol compound, or combinations thereof.

35. The pressure sensitive device as set forth in claim 33, wherein the crosslinker compound is selected from the group consisting of a melamine formaldehyde, a phenol formaldehyde, a urea formaldehyde, an anhydride, an amine, a diisocyanate, polyisocyanate, a silane, or combinations thereof.

36. The pressure sensitive device as set forth in claim 32, further comprising a dielectric material able to electrically isolate the conductive lead.

37. The pressure sensitive device as set forth in claim 30, wherein the carbon nanoparticles are dispersed in the polymeric matrix at a concentration of from about 1 wt % to about 30 wt %, wherein weight percentages are calculated as the total weight of carbon nanoparticles divided by the entire weight of carbon nanoparticles and polymeric matrix together multiplied by 100%.

38. The pressure sensitive device as set forth in claim 37, wherein the pressure sensitive material comprises between about 1 wt % and about 10 wt % of carbon nanoparticles dispersed in a polymeric matrix, wherein weight percentages are calculated as the total weight of carbon nanoparticles divided by the entire weight of carbon nanoparticles and polymeric matrix together multiplied by 100%.

39. The pressure sensitive device as set forth in claim 30, wherein the polymeric matrix further comprises fumed silica dioxide as a filler.

40. The pressure sensitive device as set forth in claim 30, wherein the pressure sensitive material further comprises a dielectric material comprising a phenoxy resin.

41. The pressure sensitive device as set forth in claim 30, further comprising an adhesive layer disposed to secure the pressure sensitive device in a folded assembly.

42. The pressure sensitive device as set forth in claim 30, wherein the pressure sensitive material comprises a polyhydroxy ether resin crosslinked with melamine formaldehyde, and wherein said pressure sensitive material has a conductivity falling within a range of about 0.01 µS/cm to about 1300 µS/cm and a sensitivity falling within a range of about 1.10 µS/lb to at least about 1.97 µS/lb over the entire temperature range of about 80° F. to about 220° F.

43. The pressure sensitive device as set forth in claim 30, wherein the pressure sensitive material comprises a polyvinylidene fluoride polymer, and wherein said pressure sensitive material has a conductivity falling within a range of about 0.01 µS/cm to about 1300 µS/cm and a sensitivity falling within a range of about 14.6 µS/lb to at least about 33.6 µS/lb over the entire temperature range of about 80° F. to about 220° F.

44. A pressure sensitive device configured to function as a pressure or force sensor, comprising:
  a nonconductive supporting substrate comprising a polyimide;
  a conductive lead supported by the substrate, comprising silver particles dispersed in a polyhydroxy ether crosslinked with melamine formaldehyde;
  a pressure sensitive material in contact with the conductive lead and supported by the substrate, comprising conductive carbon nanoparticles dispersed in a polymeric matrix selected from the group consisting of a polyvinylidene fluoride, a poly(vinylidene fluoride-hexafluoropropylene), a poly(acrylonitrile-butadiene-styrene), a poly(ethylene-2,6-naphthalene dicarbonate), a poly(bisphenol-A carbonate), a polyhydroxy ether resin crosslinked with melamine formaldehyde, or combinations thereof; said pressure sensitive material having a conductivity falling within a range of about 0.01 µS/cm to about 1300 µS/cm and a sensitivity falling within a range of about 0.01 µS/lb to about 300 µS/lb over the entire temperature range of at least about 80° F. to about 220° F.; and
  an adhesive material in contact with the substrate and configured and positioned to secure and bond together multiple layers of the device.

45. The pressure sensitive device as set forth in claim 44, further comprising a dielectric material comprising a polyhydroxy ether resin crosslinked with melamine formaldehyde.

46. The pressure sensitive device as set forth in claim 44, wherein the polymeric matrix comprises polyimide.

47. The pressure sensitive device as set forth in claim 44, wherein the pressure sensitive material comprises a polyhydroxy ether resin crosslinked with melamine formaldehyde, and wherein said pressure sensitive material has a conductivity falling within a range of about 0.01 µS/cm to about 1300 µS/cm and a sensitivity falling within a range of about 1.10 µS/lb to at least about 1.97 µS/lb over the entire temperature range of about 80° F. to about 220° F.

48. The pressure sensitive device as set forth in claim 44, wherein the pressure sensitive material comprises a polyvinylidene fluoride polymer, and wherein said pressure sensitive material has a conductivity falling within a range of about 0.01 µS/cm to about 1300 µS/cm and a sensitivity falling within a range of about 14.6 µS/lb to at least about 33.6 µS/lb over the entire temperature range of about 80° F. to about 220° F.

49. The pressure sensitive device as set forth in claim 44, comprising a first and a second layer of the non-conductive supporting substrate, wherein the conductive lead and pressure sensitive material are each configured as layers positioned between the first and second layers of the non-conductive supporting substrate, and wherein the adhesive material is positioned between the first and second layers of the non-conductive supporting substrate to secure and bond together the first and second layers of the non-conductive supporting substrate of the device.

50. The pressure sensitive device as set forth in claim 44, wherein the adhesive material comprises a synthetic rubber material and a silane coupling agent.

* * * * *

UNITED STATES PATENT AND TRADEMARK OFFICE
CERTIFICATE OF CORRECTION

PATENT NO.         : 7,785,704 B2
APPLICATION NO.    : 10/846962
DATED              : August 31, 2010
INVENTOR(S)        : Thomas Papakostas et al.

It is certified that error appears in the above-identified patent and that said Letters Patent is hereby corrected as shown below:

In column 8, line 67 should read:
more of pyromellitic dianhydride or 1,2,4,5-benzene In column 9, line 1 should read:
tetracarboxylic dianhydride (PMDA), 3,4,3',4'-benzophenone tetra-
        lines 2-3 should read:
carboxylic dianhydride (BTDA), 3,4,3',4'-biphenyltetracarboxylic dianhydride (BPDA),
terphenyl tetracarboxylic dian-
        line 10 should read:
comprise any one or more of 4,4'-oxydianiline, 4,4'-diamino In column 14, line 29 should read:
moles) of 4,4'-oxydianiline in 500 grams of 1-methyl-2-pyr- In claim 1, column 19, lines 37-38 should read:
sisting of pyromellitic dianhydride, 1,2,4,5-benzene tetracarboxylic dianhydride,
3,4,3',4'-benzophenone
        column 19, lines 39-40 should read:
tetracarboxylic dianhydride, 3,4,3',4'-biphenyltetracarboxylic dianhydride, terphenyl
tetracarboxylic dianhy-
        column 19, lines 47-48 should read:
1,3-isobenzenefurandione, or combinations thereof,
        column 19, lines 50 should read:
consisting of 4,4'-oxydianiline, 4, 4'-diamino diphenyl, 4

In claim 2, column 19, lines 66-67 should read:
and 4,4'-oxydianiline, a reaction product of 3,4,3',4'-biphenyltetracarboxylic dianhydride and
4,4'-oxydianiline, a reaction Signed and Sealed this
Eighth Day of May, 2012

David J. Kappos
*Director of the United States Patent and Trademark Office* column 20, line 1 should read:
product of 3,4,3',4'-biphenyltetracarboxylic dianhydride and
column 20, lines 5-8 should read:
4,4'-oxydianiline, a reaction product
column 20, line 9 should read:
of pyromellitic dianhydride and 1,3-phenylene diamine, a reac-
column 20, line 10 should read:
tion product of 3,4,3',4'-biphenyltetracarboxylic
column 20, line 11 should read:
dianhydride and 1,3-phenylene diamine, a reaction product of In claim 18, column 21, lines 31-32 should read:
ellitic dianhydride, 1,2,4,5-benzene tetracarboxylic dianhydride, 3,4,3',4'-benzophenone tetracarboxylic
column 21, lines 33-34 should read:
dianhydride, 3,4,3',4'-biphenyltetracarboxylic dianhydride, terphenyl tetracarboxylic dianhydride, 3,3',4,4'-
column 21, lines 41-42 should read:
1,3-isobenzenefurandione, or combinations thereof,
column 21, lines 44 should read:
consisting of 4,4'-oxydianiline, 4,4'-diamino diphenyl, 4

In claim 19, column 21, lines 63-64 should read:
and 4,4'-oxydianiline, a reaction product of 3,4,3',4'-biphenyltetracarboxylic dianhydride and 4,4'-oxydianiline, a reaction
column 21, line 65 should read:
product of 3,4,3',4'-biphenyltetracarboxylic dianhydride and
column 22, lines 2-5 should read:
4,4'-oxydianiline, a reaction product
column 22, line 6 should read:
of pyromellitic dianhydride and 1,3-phenylene diamine, a reac-
column 22, line 7 should read:
tion product of 3,4,3',4'-biphenyltetracarboxylic
column 22, line 8 should read:
dianhydride and 1,3-phenylene diamine, a reaction product of